US012563016B2

(12) United States Patent
McCord

(10) Patent No.: US 12,563,016 B2
(45) Date of Patent: **\*Feb. 24, 2026**

(54) BUILDING A MESH VIRTUAL PRIVATE NETWORK (VPN) IN A HYBRID OR MULTI-CLOUD CLUSTER

(71) Applicant: Sidero Labs, Inc., Goleta, CA (US)

(72) Inventor: Seán McCord, Atlanta, GA (US)

(73) Assignee: Sidero Labs, Inc., Goleta, CA (US)

( \* ) Notice: Subject to any disclaimer, the term of this patent is extended or adjusted under 35 U.S.C. 154(b) by 155 days.

This patent is subject to a terminal disclaimer.

(21) Appl. No.: 18/639,797

(22) Filed: Apr. 18, 2024

(65) Prior Publication Data

US 2025/0373584 A1 Dec. 4, 2025

Related U.S. Application Data

(63) Continuation of application No. 17/666,232, filed on Feb. 7, 2022, now Pat. No. 11,968,180.

(51) Int. Cl.
| | |
|---|---|
| *H04L 9/40* | (2022.01) |
| *H04L 12/46* | (2006.01) |
| *H04L 41/12* | (2022.01) |
| *H04L 61/2503* | (2022.01) |
| *H04L 101/695* | (2022.01) |

(52) U.S. Cl.
CPC ...... *H04L 63/0272* (2013.01); *H04L 12/4679* (2013.01); *H04L 41/12* (2013.01); *H04L 61/2591* (2025.05); *H04L 63/164* (2013.01); *H04L 2101/695* (2022.05)

(58) Field of Classification Search
CPC . H04L 63/0272; H04L 12/4679; H04L 41/12; H04L 61/2571
See application file for complete search history.

(56) References Cited

U.S. PATENT DOCUMENTS

| | | | | |
|---|---|---|---|---|
| 11,010,218 | B1 * | 5/2021 | Karaya | G06F 8/60 |
| 11,586,752 | B1 * | 2/2023 | Ozarkar | H04L 9/083 |
| 2021/0112036 | A1 * | 4/2021 | Hernandez | H04L 61/4552 |
| 2022/0083629 | A1 * | 3/2022 | Condon | G06F 21/105 |
| 2022/0300386 | A1 * | 9/2022 | Auch | H04L 67/56 |

\* cited by examiner

*Primary Examiner* — Esther B. Henderson
(74) *Attorney, Agent, or Firm* — SoCal IP Law Group LLP; Angelo J. Gaz; Steven C. Sereboff

(57) ABSTRACT

Devices, system and methods build a mesh virtual private network (VPN) in a hybrid cloud cluster having a private and a public cloud with connected network nodes. Each node has an operating system (OS) to discover nodes of the VPN by determining IP addresses and port addresses of the nodes from data received from discovery agents. An internal discovery agent of each of the nodes determines IP addresses and port addresses of the nodes. A node discovery agent located within a node determines IP addresses and port addresses of other nodes. An external discovery agent located outside the cluster determines IP addresses and port addresses of nodes. A VPN configuration data generator of the OS generates VPN configuration data of the clouds using the IP addresses and port addresses. A VPN builder of the OS builds a configuration of the VPN of the hybrid cluster using the VPN configuration data.

26 Claims, 6 Drawing Sheets

200

250

300

302

500

BUILDING A MESH VIRTUAL PRIVATE NETWORK (VPN) IN A HYBRID OR MULTI-CLOUD CLUSTER

RELATED APPLICATIONS

The present application is a continuation of U.S. application Ser. No. 17/666,232, filed Feb. 7, 2022, now U.S. Pat. No. 11,968,180 under the same title, of which is hereby incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to building a virtual private network (VPN) in a hybrid or multi-cloud cluster.

Description of the Related Art

Every day we use the Internet to perform a myriad of tasks such as social networking, banking transactions, stock market trades, health services, getting news, searching for information, buying goods and services, doing our work, etc. How does this complicated machinery work and how is our information kept secure while traveling through the Internet? One way is to use a virtual private network (VPN). Let's see how that can be set up.

The Internet uses the communication protocols transmission control protocol (TCP) and user datagram protocol (UDP). In TCP communication, the two computers begin by establishing a connection via an automated process called a 'handshake.' Only after this handshake has been completed will one computer actually transfer data packets to the other. UDP is a communication protocol used across the Internet for especially time-sensitive transmissions such as video playback or domain name system (DNS) lookups. In the case of DNS servers, those servers connect end user devices to the Internet by converting web names to IP numbers. DNS or user datagram protocol (UDP) speeds up communications by not formally establishing a handshake connection before data is transferred. This allows data to be transferred very quickly, but it can also cause packets to become lost in transit—and create opportunities for exploitation in the form of attacks.

These protocols are run on data networks such as local area networks, wide area networks, distributed networks, grids, clouds, clusters, etc. A computer cluster is a set of computers that work together so that they can be viewed as a single entity. Unlike grid computers, computer clusters typically have each node set to perform the same task, controlled and scheduled by software. The nodes of a cluster are usually connected to each other through fast local area networks, with each node (e.g., computer used as a client or server) running its own instance of an operating system. In most circumstances, all of the nodes use the same hardware and the same operating system, although in some setups, different operating systems can be used on each computer, or different hardware.

As datacenters have grown, become genericized and have acquired the characteristics of super clusters, they have become known as clouds. There are a number of types of clouds.

A hybrid cloud is a computing environment that combines an on-premises datacenter (also called a private cloud) with a public cloud, allowing data and applications to be shared between them. A public cloud is a datacenter from which services are rented and/or leased, akin to timesharing. In a private cloud the user is the owner, but in a public cloud there are many non-owner users.

A multi-cloud combines more than one public cloud, possibly in addition to one or more private clouds. Multi-cloud allows an organization to use more than one cloud service from more than one service provider. Examples of multi-cloud configurations include one public and one private cloud (also, a hybrid cloud), two public and one private cloud, and three or more public clouds and one private cloud, and three or more public clouds.

Clouds have significant advantages over traditional private datacenters. Whereas computing and processing demands can increase beyond a private datacenter's capabilities, a cloud can instantly scales capacity up or down to match demand. It also avoids the time and cost of purchasing, installing, and maintaining new servers that may not always be needed.

A cloud cluster—sometimes available as a feature available from a global cloud database service—takes cloud concepts a step further by enabling a single application to use the hybrid clouds and multi-clouds. With cloud clusters, data is distributed across different clouds (e.g., Amazon Web Services (AWS)®, Google Cloud Platform (GCP)®, Microsoft Azure®), but the database service behaves appears to users to be no different than a database deployed on a single, non-virtualized server.

In order to build practical cloud clusters, it may be necessary to build a mesh network which provides secure, direct communication between all nodes in a cluster, regardless of their physical network connections, physical locations or logical positions. The mesh is a network topology in which the infrastructure nodes (i.e., bridges, bridges, switches, and other infrastructure devices) connect directly, dynamically and non-hierarchically to as many other nodes as possible and cooperate with one another to efficiently route data from/to clients.

This lack of dependency of a mesh network on one node allows for every node to participate in the relay of information. Mesh networks dynamically self-organize and self-configure, which can reduce installation overhead. For example, a static IP address is assigned to a network device and will not change, even if the device reboots itself. On the other hand, a dynamic IP address is an address that can be reassigned. The network must have an already configured and operating DHCP server for the dynamic address to work.

WireGuard® is a communication protocol and corresponding open-source software that implements encrypted VPNs and was designed with the goals of ease of use, high speed performance, and low attack surface. It aims for better performance and more power-saving than the IPsec and OpenVPN tunneling protocols. The WireGuard protocol passes traffic over UDP. WireGuard aims to be a secure transport, as a network protocol that gives users, particularly system administrators or other VPN nodes, a secure way to access a computer over an unsecured network or cluster. In addition to providing secure network services, Wireguard refers to the suite of utilities that implement the Wireguard protocol. Using the Wireguard, a VPN connection is made simply by exchanging very simple public keys—exactly like exchanging Wireguard keys—and all the rest is transparently handled by the Wireguard.

Kubernetes is an open-source container orchestration tool. It helps OS and network architects manage containers, which have become the most critical aspect of computing these days. Kubernetes has many functions, including scaling of containers, deployment of containers, descaling of containers, etc. Kubernetes runs a distributed system of applications over a cluster.

The ability of mesh networks to self-configure enables dynamic distribution of workloads, particularly in the event that a few nodes should fail. This in turn contributes to fault-tolerance and reduced maintenance costs. However, such mesh networks are not always available or supportable, such as where a full mesh is not achievable across all of the nodes of, or where secure communication cannot be assured across all nodes of a cloud cluster.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Security for a cloud cluster may be provided through a mesh network which supports secure communication between all nodes in the cluster. However, such mesh networks are not always available or supportable, such as where direct communication cannot be achieved between and/or secure communication cannot be assured across all nodes of a cloud cluster. A solution to this problem is a cluster-wide virtual private network (VPN). A VPN is an arrangement where a secure, apparently private network is achieved using encryption over a public network, typically the Internet. Current computer network VPN tools or devices are unable to automatically build a VPN in a cloud cluster.

Technologies described herein provide systems and methods for building a VPN in a cloud cluster. The VPN may be a mesh VPN and the cluster may be a Kubernetes cluster (Kubernetes® by Linux Foundation in the United States).

Building the VPN may include continual automated discovering and building of a VPN of nodes executing a selected operating system on the hybrid computer cloud cluster. The VPN is used by the node's operating systems to secure communicate between nodes of the VPN. The technologies also provide systems and methods for discovering and building the VPNs between nodes of private and public clouds of a cluster. The system may be an efficient information technology (IT) VPN system that uses an operating system of cluster nodes to discover the nodes of the VPN by determining VPN node configuration data of the VPN nodes, such as IP addresses and port addresses, from discovery agents. The discovery agents may include at least one external discovery agent that does not exist as a physical node of the cluster. Herein, building a VPN may include discovering the VPN nodes and/or generating the VPN configuration data.

Description of Apparatus

Figure 1:
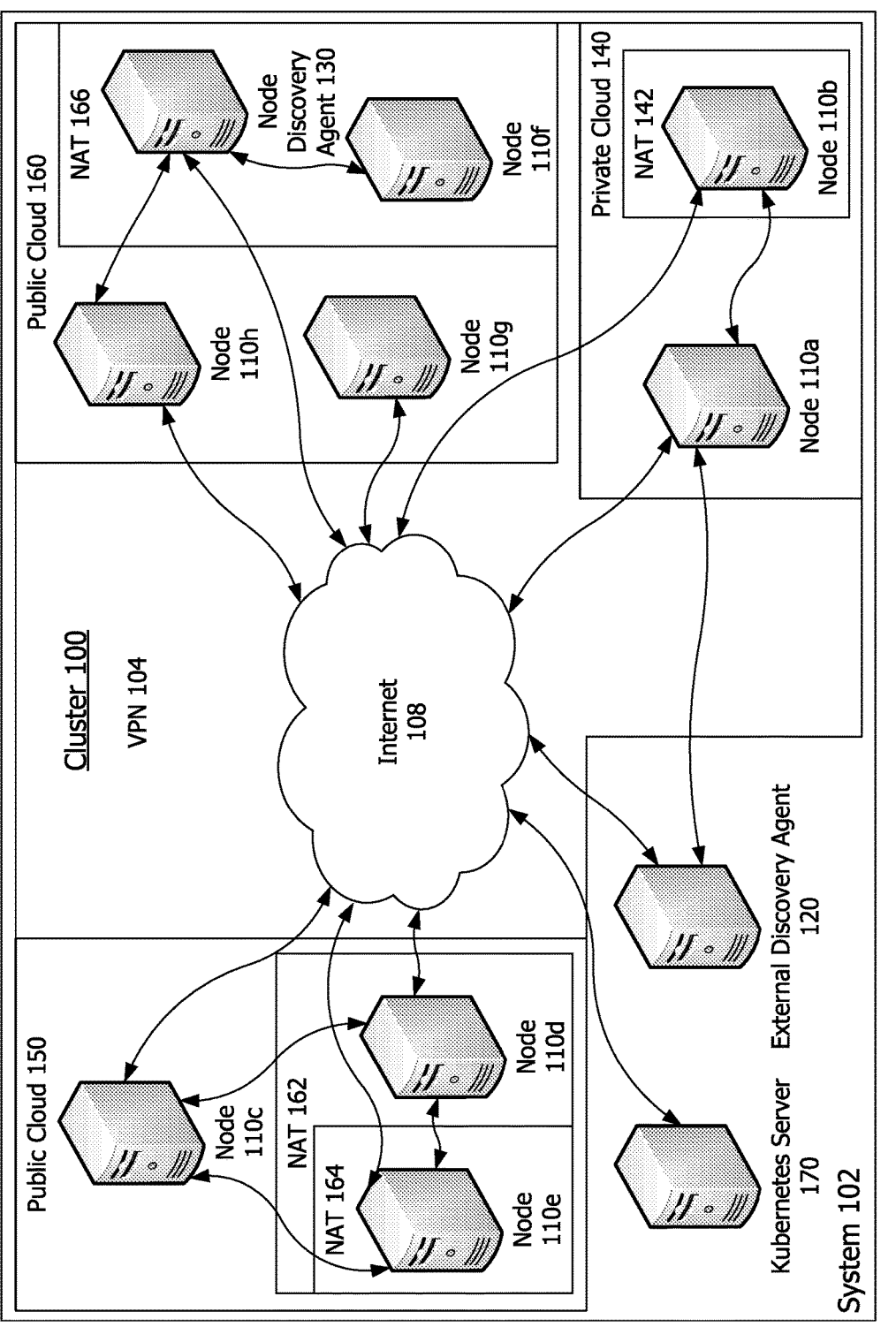
FIG. 1 is a diagram of a computer cluster having a system for building a VPN between nodes of a cloud cluster.

Referring now to FIG. 1, there is shown a cloud cluster 100 having a system 102 for building a mesh virtual private network (VPN) 104 between nodes of the cluster 100. The system 102 includes all the nodes of clouds 140, 150 and 160; and external discovery agent 120. The VPN 104 includes all the VPN nodes shown for clouds 140, 150 and 160; and excludes external discovery agent 120. Cluster 100 is a Kubernetes cluster with nodes which are managed by a Kubernetes container manager (not shown). The Kubernetes container manager allows multiple containers to share a single hardware platform. The cluster 100 includes private cloud 140 and public clouds 150 and 160 and an external discovery agent 120 interconnected through Internet 108. The external discovery agent 120 is software operating on an independent, an external and\or a stand-alone node of the cluster 100 that is not a VPN node. The agent 120 is not necessarily part of cluster 100 but connects to the nodes of the cluster 100.

Public cloud 160 includes a node discovery agent 130, and public nodes 110f, 110g, 110h and may have additional public nodes. The node discover agent 130 is a VPN node that is part of the VPN which is a node chosen from cloud 150 (though it could be from any of clouds 140, 150 or 160) to be a node discover agent. In some cases, node 130 is also a route node due to its connection to node 110f as will be explained. Route nodes are configured to "route" or communicate data packets between nodes of the VPN nodes that are not directly connected to each other. All nodes of the VPN can incorporate a node discovery agent. The node discovery agent may include the software which discovers the set of nodes in the cluster or VPN, and be a component of each node, regardless of whether that node is a route node or a normal (leaf) node.

Private cloud 140 includes private nodes 110a and 110b.

Public cloud 150 includes public nodes 110c, 100d and 110e. Public cloud 150 may include at least one cloud service from a cloud service provider and which may include additional public nodes.

The public clouds 150, 160 may be a micro-service group of nodes, a macro-component group of nodes and/or a service provider such as Amazon Web Services (AWS)®, Google Cloud Platform (GCP)®, Microsoft Azure®). For instance, organizations are becoming more sophisticated in their usage of cloud services, graduating from infrastructure hosting and automation, to building their applications with cloud-native offerings in analytics, serverless development, AI, and even industry-specific services.

Cluster 100 includes VPN 104 to provide secure communication between all nodes in the VPN (e.g., VPN nodes), regardless of their physical network connections. Cluster 100 may have other nodes in addition to the VPN nodes, such as external discovery agent 120; and non-VPN nodes, control plane nodes and/or infrastructure nodes that are not shown.

System 102 automatically builds the VPN 104 in the cloud cluster 100. The system 102 includes public and private nodes of the public and private clouds 150, 160, 140 as well as the external discovery agent 120. The system 102 discovers and/or builds VPN nodes of clouds 140, 150 and 160 of VPN 104.

System 102 builds (e.g., sets up) VPN 104 as an opportunistic peer-to-peer WireGuard-based network of connected VPN nodes. Some of the VPN nodes of VPN 104 are connected only temporarily and the network topology may change due to node mobility or node activation and node deactivation. The VPN 104 provides at least the following functionalities: node discovery where a VPN node is able to discover other VPN nodes in direct communication range; and one-hop message exchange where a VPN node is able to send and receive arbitrary data to or from any other VPN node in direct communication range or that it is directly connected to.

The VPN 104 allows data and applications to be shared between the VPN nodes of the public and private clouds 150, 160, 140. Communication between the clouds 140, 150, 160 may be across the Internet 108, while communication between nodes with a given clouds may be across a local area network (LAN), across the Internet 108 or otherwise for nodes of a cloud computer network.

Each of the nodes 110a-110h and 130 and external discovery agent 120 may be a physical node, a virtual node or another network element. A physical node is a machine, a computing device or a part thereof that communicates with other nodes. Examples of physical nodes are a physical host, a physical disk (e.g., within a server or attached to a server in a cloud situation), a physical load balancer, a server, a client, a physical internal service, a desktop, a router, an infrastructure node, a network switch, a laptop or other computing device, such as device 500 in FIG. 5. A virtual node is a software representation of a machine, a computing device or a part thereof that communicates with other nodes. Examples of virtual nodes are a virtual host, a virtual disk, a virtual load balancer, a database, a logical clustered group of resources, a macro-component, a virtual cloud of nodes, a physical cloud of nodes, a logical service, a virtual internal service, a virtual computing device, that exists on or is a device 500 in FIG. 5. Each of the nodes may include at least one network interface for communicating with at least one other node, such as interface 516 in FIG. 5.

The clouds 140, 150 and 160 and the nodes therein are representative. Thus, the VPN 104 may itself be a mesh between clouds having respective VPN nodes.

In some cases, implementing a VPN as a full mesh network is not a scaling issue because the WireGuard interface of the WireGuard-based network is built to be a very trim protocol, with both little overhead and little connection maintenance (in fact, there is no connection per se because WireGuard is a UDP-based protocol. That said, there may still be a few scenarios in which full mesh networking is not an option, either due to the network overhead involved or draconian security measures. In this case, system 102 can use network route nodes such as route node 130 that is one (e.g., dynamically) chosen node, designated as the route node for a given Layer 3 subnet.

Figures 2A, 2B:
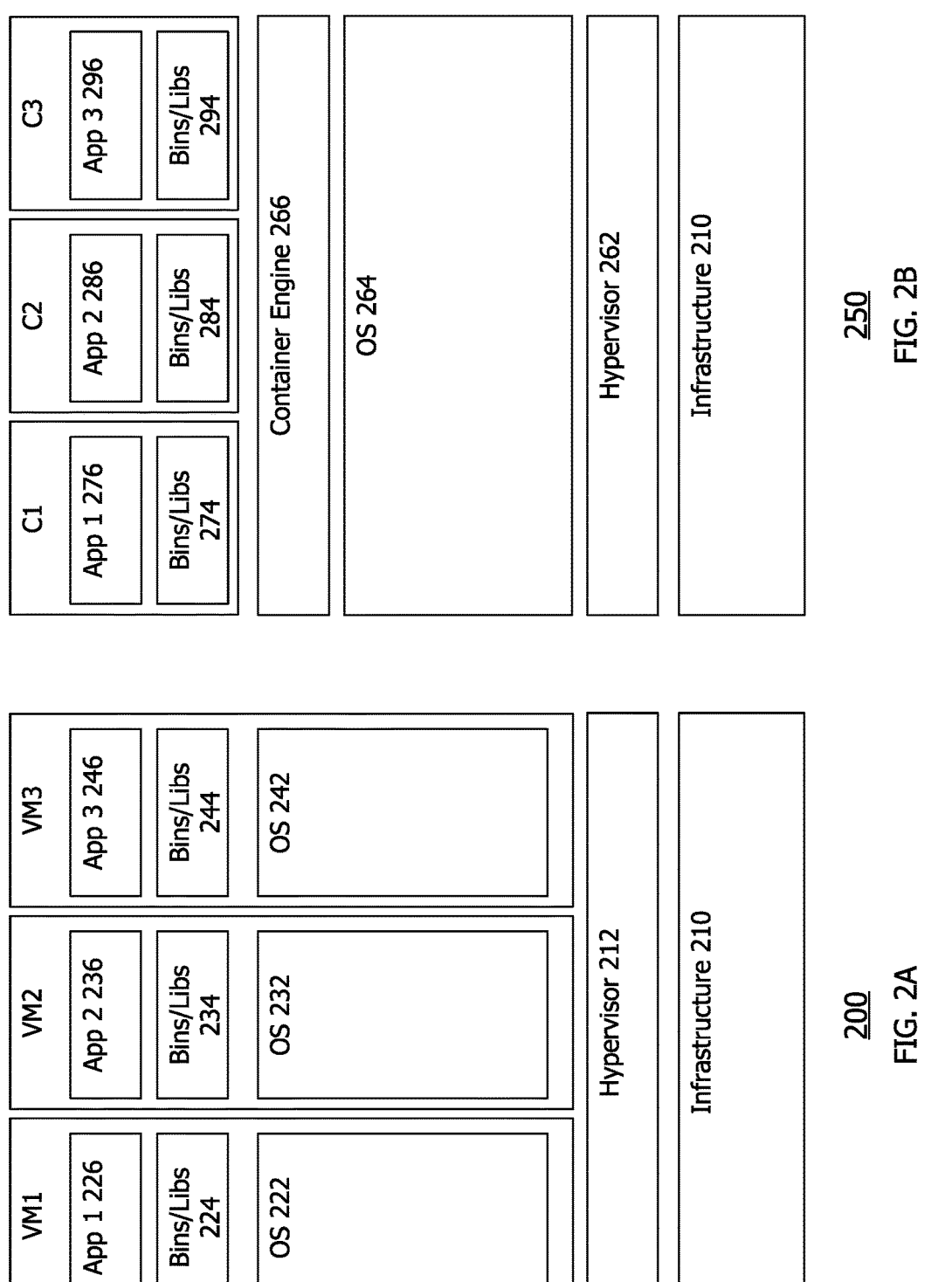
FIG. 2A is a first example node that can be part of the cluster of FIG. 1.
FIG. 2B is a second example node that can be part of the cluster of FIG. 1.

FIG. 2A is an example node 200 of the cluster of FIG. 1 having virtual machines (VMs). Node 200 may or may not be one or more nodes of VPN nodes 104. Node 200 has infrastructure 210 such as physical hardware compute, memory, storage and networking resources. Node 200 has a hypervisor 212 running (e.g., executing) on infrastructure 210, such as a virtual machine manager (VMM) having a sole purpose of allowing multiple virtual machines to share a single hardware platform of hypervisor 212. In the example of FIG. 2A, virtual machines VM1, VM2 and VM3 are running on hypervisor 212. For example, virtual machine VM1 has operating system (OS) 222, bins and libraries (Bins/Libs) 224 and Application 1 (App 1) 226 running on hypervisor 212. Application 1 226 runs on operating system 222 and uses bins and libraries 224 for secure communications between Application 1 226, other applications of node 200 and/or applications of other nodes of the VPN 104. Application 1 226 can be a Kubernetes application program interface (API) for communicating with the Kubernetes server 170. The server 170 may be located outside the VPN 104. It is shown as being outside of Kubernetes cluster 100 such as being located in a server that is not part of or a node the cluster 100. In other cases, it is inside of and part of Kubernetes cluster 100.

For instance, node 200 may be a Kubernetes node and its infrastructure 210 includes a VPN-capable network interface. OS 222 may use infrastructure 210 and hypervisor 212 to discover and build VPN 104 that includes other applications of node 200 and/or applications of other nodes of the VPN 104. Then, OS 222 may use infrastructure 210 and hypervisor 212 for secure communications between Application 1 226 and/or other applications of node 200 and/or applications of other nodes of the VPN 104. OS 222, 232 and 242 may be three instances of the same software or Talos® operating system such as an OS by Talos Systems, Inc., of Goleta, CA. Hypervisor 212 may include an instance of a VPN network interface, such as a WireGuard secure transport.

Virtual machine VM2 and VM3 have similar structures and goals of their applications as that of virtual machine VM1. For example, virtual machine VM2 has operating system (OS) 232, bins and libraries (Bins/Libs) 234 and Application 2 (App 2) 236 running on hypervisor 212. Also, virtual machine VM3 has operating system (OS) 242, bins and libraries (Bins/Libs) 244 and Application 3 (App 4) 246 running on hypervisor 212. Application 2 236 and application 3 246 can be performing the same or different goals than that of application 226. Note that for node 200, three different instances of the OS are needed to run the three VMs.

FIG. 2B is an example node 250 of the cluster of FIG. 1 having containers (C). Node 250 is some or all of the VPN nodes of VPN nodes 104. The components of node 250 are the same as node 200 except as explained below.

A container network is a form of virtualization similar to virtual machines (VM) in concept but with distinguishing differences. Primarily, the container method is a form of operating system virtualization as compared to VMs, which are a form of hardware virtualization.

Node 250 has infrastructure 260 such as physical hardware compute, memory, storage and networking resources. Node 250 has hypervisor 262 running on infrastructure 260. Operating system (OS) 264 is running on hypervisor 262, and container engine 266 is running on OS 264. The container engine 266 may implement a container system, such one using a Kubernetes container manager, having a sole purpose of allowing multiple containers to share a single hardware platform of hypervisor 262. Notably, containers C1, C2 and C3 are running on engine 266 and OS

264. Container C1 has bins and libraries (Bins/Libs) 274 and Application 1 (App 1) 276 running on engine 266 and OS 264. Application 1 276 runs on operating system 264 and uses bins and libraries 274 to perform the goals of application 276, which include or require performing secure communicate between Application 1 276 and/or other applications of node 250 and/or applications of other nodes of the VPN 104. Application 1 276 can be a Kubernetes application program interface (API) for communicating with the Kubernetes server 170.

Figure 3A:
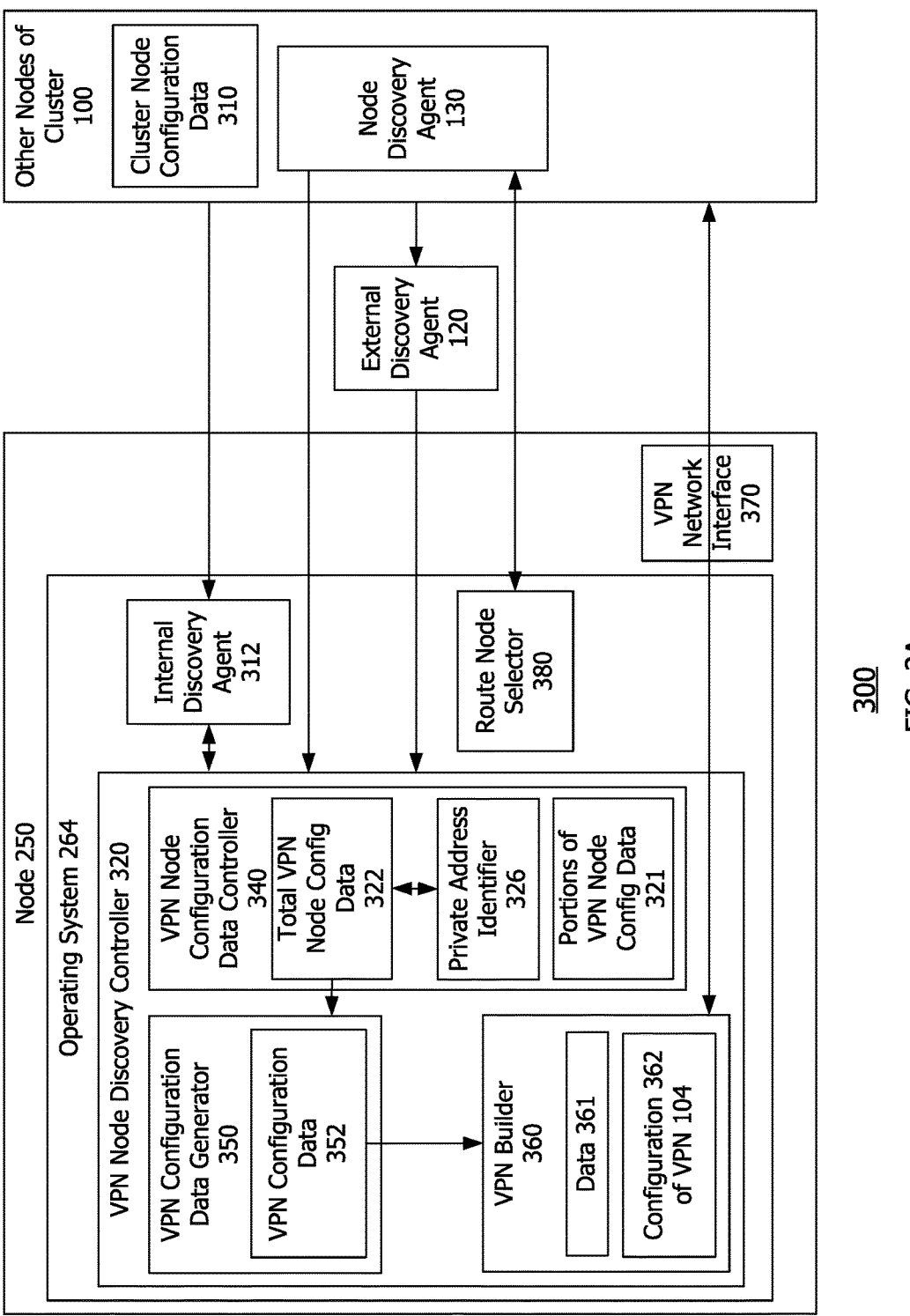
FIG. 3A is an example of an operating system (OS) of a VPN node of FIG. 2B.

For instance, node 250 is a Kubernetes managed node and infrastructure 260 includes a VPN hardware, such as including an ethernet adapter for network communications, having a network interface for performing secure communicate between Application 1 276 and/or other applications of VM1 and other nodes of the VPN 104. OS 264 may use infrastructure 260 and hypervisor 262 to discover and build VPN 104 that includes other applications of node 250 and/or applications of other nodes of the VPN 104. Then, OS 264 may use infrastructure 260 and hypervisor 262 to perform secure communicate between Application 1 276 and/or other applications of node 250 and/or applications of other nodes of the VPN 104. OS 264 may be one instance of a software or Talos® operating system. Hypervisor 262 may include an instance of a VPN network interface, such as a WireGuard® secure transport that is a virtual interface connected to an ethernet network adapter of infrastructure 260. Interface 370 of FIG. 3A is an example of the VPN network interface.

Containers C2 and C3 have similar structures and goals of their applications as that of container C1. For example, container C2 has bins and libraries (Bins/Libs) 284 and Application 2 (App 2) 286 running on engine 266 and OS 264. Also, container C3 has bins and libraries (Bins/Libs) 294 and Application 3 (App 3) 296 running on engine 266 and OS 264. Application 2 286 and application 3 296 can be performing the same or different goals than that of application 276. Any two or more of these containers that perform the same goals form a container pod. Note that for node 250, only one instance of the OS 264 is needed to run the three containers. When OSs of node 200 or 250 is using WireGuard as a VPN network interface, system 102 may be a "wglan" node discovery system that is implemented by the Talos OS.

In some embodiments that use a Talos implementation, all WireGuard or VPN nodes run containers; any virtual machines they run are run downstream of those containers. Since KubeSpan is designed to empower Kubernetes, and since Kubernetes is powered by containers, the focus in these embodiments is on containers. KubeSpan may be part of and execute on the Kubernetes server 170. The Talos implementation may be where some of the OSs of the VPN 104 are Talos and Talos is used to discover and build the VPN 104.

In some cases, all of the VPN nodes of cluster 100 are VPN nodes having containers, such as VPN node 250. Using nodes 250 in VPN 104 forms a container network that provides an application sandboxing mechanism (e.g., of each container) that can be used in home desktops and web-scale enterprise networking solutions similar in concept to a virtual machine. Isolated inside the container from the host and all other containers can be a full-featured Linux environment with its own users, file system, processes, and network stack. All applications inside the container are permitted to access or modify files or resources available inside the container only.

It is possible to run multiple containers at the same time, each with their own installations and dependencies. This is particularly useful in instances when newer versions of an application may require a dependency upgraded that may cause conflicts with other application dependencies running on the server. Unlike virtual machines, containers share host resources of engine 266, OS 264, hypervisor 262 and infrastructure 260 rather than fully simulating all hardware using VMM of hypervisor 212 on the computer, making containers smaller and faster than virtual machines and reducing overhead. Particularly in the context of web-scale applications, containers were designed as a replacement to VMs as a deployment platform for microservice architectures, such as those of public clouds.

Each virtual machine VM1, VM2 and VM3 running on a hypervisor 212 has their own operating system, applications, and libraries, and are able to encapsulate persistent data, install a new OS, use a different filesystem than the host, or use a different kernel version. Conversely, containers C1, C2 and C3 are a running instance of an image, ephemeral operating system 264 virtualization that spins up to perform some tasks then is deleted and forgotten. Because of the ephemeral nature of containers, system users run many more instances of containers than compared to virtual machines requiring a larger address space.

Container management is a vital aspect of networking with containers. Thus, with today's changing traffic requirements, the importance of using a container manager has increased tenfold. The container requirements of many companies have increased vastly in the past few years to where they may need hundreds of containers to maintain a high availability and to balance the traffic. When traffic increases, they need more containers for handling requests. When the traffic decreases, they need scaling down of the containers. Managing the large number of containers according to the demand can be challenging. Manually managing or orchestrating the containers can take a lot of time and resources. Automating the scaling and descaling of containers with Kubernetes makes things a lot simpler and allows the manual management time and resources to be spent elsewhere.

To create isolation, a container (e.g., C1, C2 or C3) relies on two Linux kernel features: namespace and cgroups. To give the container its own view of the system 102 isolating it from other resources (e.g., cluster components), a namespace is created for each of the resources and unshared from the remaining system. Control groups (Cgroups) are then used to monitor and limit system resources like CPU, memory, disk I/O, network, etc.

Kubernetes resources, such as pods and deployments, may be logically grouped into a namespace to divide cluster 100 and restrict create, view, or manage access to resources or components of the cluster. For example, system 102 can create namespaces to separate business groups. Users can only interact with resources within their assigned namespaces. When system 102 creates cluster 100, the namespaces that may be available include a default namespace for objects with no other namespace; a kube-system namespace for objects created by the Kubernetes system; a kube-public namespace that is created automatically and is readable by all users (including those not authenticated); and a kube-node-lease namespace for the lease objects associated with each node which improves the performance of the node heartbeats as the cluster scales.

In Linux, the network namespace will give a networking stack that has its network devices, routes, and rules for the firewall. Every running process in Linux would communicate with this network namespace. A pod possesses a group of containers within a network namespace, such as any of containers C1-C3 performing a similar goal. These containers have the same port space and IP address, which is assigned to them through the network namespace. These containers find each other through the localhost because they are located in the same namespace. If applications 276, 286 and/or 296 are within a pod, they can access the shared volumes or Bins/Libs as well.

FIG. 3A is an example 300 of operating system (OS) 264 of a VPN node 250 of FIG. 2B and the OS's connections to other cluster components of the system 102 and/or cluster 100. In other cases, FIG. 3A can be an example of the OS (e.g., OS 222 instead of OS 264) of VPN node 200 of FIG. 2A instead of that of node 250. OS 264 includes internal discovery agent 312, route node selector 380 and VPN node discovery controller 320. VPN node discovery controller 320 has VPN node configuration data controller 340, VPN configuration data generator 350 and VPN builder 360. Internal discovery agent 312 is connected between VPN node configuration data controller 340 and the nodes of cluster 100. Example 300 has node discovery agent 130 connected between VPN node configuration data controller 340 and the nodes of cluster 100. Agent 130 may be any of the VPN nodes of VPN 104. Example 300 also has external discovery agent 120 connected between VPN node configuration data controller 340 and the nodes of cluster 100. Agent 120 is not any of the VPN nodes of VPN 104.

Node 250 also has VPN network interface 370 such as a WireGuard secure transport connected to an ethernet network adapter. Interface 370 is connected between operating system 264 and the nodes of cluster 100 to: 1) properly address for transmission to another VPN node, data packets obtained from applications, components and/or containers of the node; and 1) properly submit to applications, components and/or containers of the node, data packets received from other VPN nodes. The interface may also be connected (not shown) to applications, components and/or containers of the node to obtain the data for transmission and submit the received data.

The connections to between agent 312 and cluster 100 is not made through interface 370. The connections to between controller 320 and (cluster 100 or agent 120) are not made through interface 370. Interface 370 is the local interface through which applications on the host node 250 are directed when they want to communicate with other VPN nodes within the cluster. The network interface through which WireGuard interface 370 establishes a connection to any other peer or other VPN node may be undetermined. It may be up to the configuration of the host, network, and configuration thereof and may be outside the scope of this specification.

VPN node configuration data controller 340 is configured to discover nodes of the VPN 104 by determining total VPN node configuration data 322 of the VPN nodes of the VPN 104 based on portions of VPN node configuration data 321 determined by and received from each of the discovery agents 312, 130 and 120. Each of these portions of data 321 may include the following three key data: multiple endpoint IP addresses and port addresses for that node to connect to; shared cryptographic public keys of the nodes; and/or a list of accepted IP addresses for that node to connect to. It is noted that descriptions herein may refer to IP address, however, in these cases, that description of an IP address actually refers to using IP address plus port address, not merely IP address. Accepted IP addresses is the list of addresses for which a given node is authoritative and is managed by controller 320. Accepted IP addresses is the list of IP addresses (and prefixes) which can be reached through the VPN network interface 370 for each VPN node or peer node.

The multiple endpoint IP addresses and port addresses for that node to connect to are or include private or public IP addresses and port addresses of the VPN nodes of the VPN 104 that are discovered by the discovery agents. An endpoint may be an object that gets IP addresses of individual pods assigned to it. M ore directly, an endpoint may be an object which receives communications at a given IP-port coordinate. The endpoint object is then in turn referenced by a Kubernetes service, so that the service has a record of the internal IPs of pods in order to be able to communicate with them. The shared cryptographic public keys of the nodes may be keys that are used with private keys of the VPN 104 or WireGuard interface 370 to perform secure communication between the nodes. The list of accepted IP addresses for that node to connect to may be IP addresses of other VPN nodes that are authorized by the VPN 104 and WireGuard interface 370 for this node to perform secure communication with.

Controller 340 determining total VPN node configuration data 322 may include combining all of the portions of the VPN node configuration data 321 received from the discovery agents to determine all three of the three key data for each of the VPN nodes of VPN 104. For example, the portions of data 321 may be only some of the three key data (e.g., only public IP addresses) of certain nodes received from a discovery agent and the remaining portions of the data 322 for the certain nodes is provided by other discovery agents and/or is determined by controller 340. In addition, or independently, the portions of data 321 may be all of the three key data of only some of the VPN nodes of VPN 104 received from a discovery agent, such as where the rest of the total data 322 for the remaining portions of the VPN nodes is provided by other discovery agents and/or is determined controller 340. In either or both cases, the portions of data 321 and remaining portions of the total data 322 are then combined by controller 340 to create the total data 322, such as by controller 340 creating a list of all of the VPN nodes of VPN 104 that does not include redundant information of the three key data.

The discovery agents may be an internal discovery agent 312 of container engine 266 and/or OS 264 of each VPN node of VPN 104; a node discovery agent 130 of container engine 266 and/or OS 264 of one or more VPN nodes of VPN 104; and/or an external discovery agent 120 of one or more non-VPN nodes of VPN 104. Discoveries can start when a VPN node sends its three key data items to one or more discovery registries of internal and/or external discovery agents. Upon discovering at least two VPN nodes, the VPN 104 can be built. The internal discovery registry may be Kubernetes, so it utilizes the Kubernetes Endpoint to register those three key data items. Namespaces may not be involved. as more VPN nodes send their three key data, the VPN 104 continues to be discovered and built. The internal discovery agent is "internal" in the sense that it is maintained within the cluster. The most usual implementation is the Kubernetes registry. This is "internal" because Kubernetes itself is hosted inside the cluster. The internal discovery agents interact with the internal discovery registries, and the external discovery agents interact with the external discovery registries.

The internal discovery agent 312 may utilize the Kubernetes API to store and retrieve metadata about itself generally and in relation to VPN 104 for further coordination with other nodes' discovery agents. The internal discovery agent 312 may use that Node's Kubernetes API to determine portions of the VPN configuration data 321 of its own node as well as the data 321 of other VPN nodes of the VPN 104. A Kubernetes API may be part of each or some of the VPN nodes. The Kubernetes API may access a Kubernetes API server 170 that is part of cluster 100 or is external to the cluster. The internal discovery agent 312 may use Kubernetes of the Kubernetes API server 170 as a database and data exchange. Kubernetes annotations can be used to attach identifying metadata to objects, such as attaching to the node, the public key of that node which may be the singular identifying information used to discover and build the VPN. Clients such as tools and libraries can retrieve this metadata. The metadata in an annotation can be small or large, structured or unstructured, and can include characters not permitted by labels. The API is part of Kubernetes, which may be the orchestration software for which KubeSpan or system 102 (e.g., wglan) was designed to assist. The Kubernetes API service is provided by the Kubernetes API server 170, which runs on a relatively small subset of the nodes of the cluster 100 or VPN 104. It supplies the data store to or in which system 102 stores its Kubernetes-based internal discovery registry. The Kubernetes API may be required for that registry to operate.

The internal discovery agent or OS 264 may send the portions of VPN node configuration data 321 determined by agent 312 of the VPN 104 to the Kubernetes API. It may determine the portions of VPN node configuration data 321 from cluster node configuration data 310 of the cluster nodes received, as shown by the arrow and send the portions to controller 340. The internal discovery agent 312 registers its Public Key, known endpoints (e.g., IP addresses and port addresses for that node to connect to), and any IP addresses for which it is directly responsible to the Kubernetes API server 170, which in turn stores the information to the Kubernetes Database. Additionally, internal discovery agent 312 reads its own additional assigned Pod IP address block range from the Kubernetes API server 170. Finally, the internal discovery agent 312 then retrieves that same information about all the other cluster nodes or VPN nodes from the Kubernetes API server 170. That is, agent 312 retrieves the Public Key, known endpoints, and any IP addresses for which the other nodes are directly responsible; and the other nodes own additional assigned Pod IP address block range. Agent 312 then sends all this discovered information for itself and the other cluster nodes (internally) to VPN node configuration data controller 340 for deduplication and aggregation into total VPN node configuration data 322. Agent 312 also sends its total VPN node configuration data 322 to all other "peer" VPN nodes listed in its list of peer nodes 357 of FIG. 3B.

The node discovery agent 130 may be one of the VPN node of the cluster 100 that uses a use a Kubernetes API to determine portions of the VPN configuration data 321 of only other VPN nodes of the VPN 104. The node discovery agent 130 may use a Kubernetes API and an annotation-marked Kubernetes node resource to determine the portions of VPN configuration data of the other VPN nodes.

The node discovery agent 130 may send the portions of VPN node configuration data 321 discovered by agent 130 to other VPN nodes of the VPN 104. It may determine the portions of VPN node configuration data 321 from cluster node configuration data 310 of the cluster nodes and send, as shown by the arrow to controller 340. The node discovery agent 130 registers its Public Key, known endpoints, and any IP addresses for which it is directly responsible to the Kubernetes API server 170, which in turn stores the information to the Kubernetes Database. Additionally, node discovery agent 130 reads its own additional assigned Pod IP address block range from the Kubernetes API server 170. Finally, the node discovery agent 130 then retrieves that same information about all the other cluster nodes or VPN nodes from the Kubernetes API server 170. That is, agent 130 retrieves the Public Key, known endpoints, and any IP addresses for which the other nodes are directly responsible; and the other nodes own additional assigned Pod IP address block range. Agent 130 then sends all this discovered information for itself and the other cluster nodes (internally) to VPN node configuration data controller 340 for deduplication and aggregation into total VPN node configuration data 322 at node 130. Agent 130 also sends its total VPN node configuration data 322 to all other "peer" VPN nodes listed in its list of peer nodes 357 of FIG. 3B.

In some cases, all nodes of system 102 or of cluster 100, including the internal agent 312 and agent 130, send and update the registries (internal to that node and external to other peer nodes) with additional information if that node determined that its local registry's data is lacking as some piece of discovered information which that node now knows was lacking. For example, any of the VPN nodes (via its internal discovery agent) pulls down from the Kubernetes API server 170 (in this external registry) the cluster configuration for each of its peers-to-be, assembles those data with its own discovered data (is this internal registry), and then (if there is a difference in the two) sends the amended data back to the registry (internal and/or external). The cluster configuration may include the current nodes, and the other nodes (e.g., in the list of peer nodes) Public Key, known endpoints, and any IP addresses for which the current and other node is directly responsible. VPN configuration data may not be sent through the VPN network interface. Instead, discovery allows each VPN node to able to configure that nodes VPN network interface 370 based on the discovered total data 322. One purpose of node 130 is to provide routing capabilities for nodes which can not (for whatever reason) establish their own connections to certain other nodes, such as to node 110f. This is why it is called a route or routing node. A common case would be: Public Cloud 160 nodes 130 and 110f are behind a restrictive NAT 166. A single port forward is defined which allows inward UDP traffic from the internet to node 130. Upon its promotion to a route node, 130 begins to advertise availability of the other node 110f (or nodes) within public cloud 160, whereupon it forwards traffic through its own Wireguard connection 370 on behalf of the other node(s) within public cloud 160. There would only be a single route node for each location behind a restrictive NAT, such as NAT 166.

The external discovery agent 120 may be located outside the VPN 104. It may be outside of Kubernetes cluster 100 such as being located in a server that is not part of or a node the cluster 100. The external discovery agent 120 may utilize the Kubernetes API to store and retrieve metadata about itself generally and in relation to VPN 104 for further coordination with other nodes' discovery agents. The external discovery agent 120 may use that Node's Kubernetes API to determine portions of the VPN configuration data 321 of its own node as well as the data 321 of other VPN nodes of the VPN 104. Agent 120 maintains an ephemeral database which collects and maintains the three key data for nodes of VPN 104. As Agent 120 is external to the cluster and is presumed to be untrusted, so these data are always encrypted with a key unknown to Agent 120 before being sent to other nodes. The data are organized block-wise to facilitate comparison and deduplication by Agent 120 while also maintaining opaqueness to it. The external discovery agent makes available portions of VPN node configuration data 321 determined by agent 120 to all or some VPN nodes of the VPN 104.

As part of determining portions (or all) of the VPN configuration data, agent 120 may collate on a per-cluster basis for multiple clusters, the VPN configuration data and/or VPN node IP addresses and port addresses of cluster 100. Agent 120's job includes collating the total VPN data 322 at agent 120: that is, it groups the data by cluster, making available cluster/VPN data to members of each cluster, respectively. That is, it isn't a big grab bag of all nodes in all clusters, but organizes the data by cluster, to present each node with a set of data for its own cluster only. Agent 120 sends its collated total VPN node configuration data 322 to all of the VPN nodes, such as to all other "peer" VPN nodes listed in its list of peer nodes 357 of FIG. 3B.

Agent 120 may determine the portions of VPN node configuration data 321 for some or all of the VPN nodes of VPN 104 from cluster node configuration data 310 received from the cluster nodes and send, as shown by the arrow to controller 340. Just like the internal registry of a node, the external discovery agent 120, which may be a service, receives updates from the nodes themselves, both from the registering nodes and from other nodes upon successfully connecting to a node (and thus sending the updated endpoint information such as data 322 of the registering node back to the registry of agent 120). As the external discovery agent, from its perspective, only deals with opaque data, it only knows the organization of the data and whether they are different. When it receives data, it compares that data against the data it has for the associated cluster-and-node. If that data differs, all other registered-and-listening nodes are notified of that update. In this way, the system is highly reactive to changes and very fast. Say the key data can be expressed as K1, [EP1, EP2, EP3], [A1, A2] for node N1 in Cluster X1. Variables are used here because the external registry sees only opaque data. K=public key, EP=endpoint coordinate, A=authoritative address, N=Node, K=ClusterID. The indices are internal identifiers for the opaque data. Node N1 registers its known information (K, EP*, A*) with a gent 120 (the external registry). All other nodes are then notified of the (new) registration and are sent those details, such as from data 322 of agent 120. Node N2 connects to Node N1 and notices that it sees N2 at a different Endpoint than those listed in the set [EP1, EP2, EP3]. It therefore sends a new Endpoint, EP4, (data 321) to the registry. The external registry Agent 120 adds EP4 to the key data for N1 and issues another subsequent notification to each listening Node, who in turn integrate this new information into their own local data controllers 340, to be ultimately included in the VPN configuration data 352.

In some cases, the external discovery agent 120 registers its public key, known endpoints, and any IP addresses for which it is directly responsible to the Kubernetes API server 170, which in turn stores the information to the Kubernetes Database. Additionally, external discovery agent 120 may read its own additional assigned Pod IP address block range from the Kubernetes API server 170. Finally, the external discovery agent 120 then retrieves that same information about all the other cluster nodes or VPN nodes from the Kubernetes API server 170. That is, agent 120 retrieves the Public Key, known endpoints, and any IP addresses for which the other nodes are directly responsible; and the other nodes own additional assigned Pod IP address block range. Agent 120 then sends all this discovered information for itself and the other cluster nodes (internally) to VPN node configuration data controller 340 for deduplication and aggregation into total VPN node configuration data 322 at node 120. Agent 120 also sends its total VPN node configuration data 322 to all other "peer" VPN nodes listed in its list of peer nodes 357 of FIG. 3B.

In some cases, the cluster 100 nodes may periodically provide the external discovery agent 120 with the portion of VPN node configuration data 321 for that agent.

Here, determining the portion of data 321 includes the external discovery agent periodically updating the VPN node OSs (such as OS 264) of the VPN 104 with the determined portion of VPN node configuration data 321.

In some cases, there is no node discovery agent 130 in the cluster. In some cases, there is only one or more external discovery agents 120 in the cluster 100 which determines the configuration data for the VPN nodes and sends it to be determined by each VPN node. In cases where they exist, there may be more than one node discovery agent 130 and/or more than one external discovery agent 120. In some cases, there are only internal discovery agents 312 in the cluster.

In some cases, the total VPN node configuration data 322 is or only includes the private, not public, addresses and port addresses received from the discovery agents and/or identified by the OS 264. For instance, the portions of VPN node configuration data 321 received from the discovery agents may be or include private addresses and port addresses of the VPN nodes. In this case, the discovery agents may have identified the private addresses and port addresses of the nodes: 1) by directly determining the private addresses and port addresses from the first and second set nodes 2) by using a private address identifier, such as identifier 326 of controller 340, of that discovery agent to translate the private addresses and port addresses from single or double public network address translated (NAT such as single NATed or double NATed) IP addresses and private port addresses of the first and second set of nodes.

NAT is a way to map multiple local private addresses to a public one before transferring the address information. Organizations that want multiple devices to employ a single IP address use NAT, as do most home routers. For example, if there is a laptop which is node 110b connected to a home router which is node 110a and the laptop searches for directions to a favorite restaurant, the laptop sends this request in a packet to the router, which passes it along to the Internet 108. But first, the router of node 110a changes the outgoing IP address from a private local address to a public address.

In other instances, the portions of VPN node configuration data 321 received from the discovery agents may be or only include the public, not private, addresses and port addresses of the VPN nodes. In this case, the OS 264 may use a private address identifier 326 of controller 340 to identify the private addresses and port addresses of the nodes from the public addresses in data 321 for use in the total VPN data 322, as noted above for private addresses being determined by the discovery agents. In some instances, some of the private addresses and port addresses will be determined by the discovery agents and some by the private address identifier 326. Total VPN data 322 has the private addresses of the VPN nodes and cluster components of those nodes.

The single public NATed IP addresses and private port addresses, such as for VPN node 110d which from node 110c is under NAT 162, may be translated by the discovery agents or private address identifier 326 automatically penetrating NAT (and this actually covers most cases). The double public NATed IP addresses and private port addresses, such as for VPN node 110e which from node 110c is under NAT 162 then NAT 164, may be translated by the discovery agents or the private address identifier 326 using additional tooling external to the operating system, such as tooling borrowed for VoIP that can be accessed by identifier 326.

This additional tooling may include session traversal utilities for NAT (STUN) which is a standardized set of methods, including a network protocol, for traversal of NAT gateways in applications of real-time voice, video, messaging, and other interactive communications. This tooling may also include interactive connectivity establishment (ICE) which is a protocol used to generate media traversal candidates which can be used in WebRTC applications, and which can be successfully sent and received through NATs. In addition, this tooling may include traversal using relays around NAT (TURN) which is a protocol that assists in traversal of NAT or firewalls for multimedia applications. Each of these tools may be used with UDP to provide a tool for hosts to discover the presence of a network address translator, and to discover the mapped, usually public, IP address and port number that the NAT has allocated for the application's UDP flows to remote hosts. The internal discovery agent, the node discovery agent and/or the external discovery agent may provide required assistance to these protocols as third-party network servers located on the opposing (public) side of the NAT such as through the cloud LAN or the Internet 108.

The total VPN node configuration data 322 of node 250 may be for all of the VPN nodes of VPN 104. In other cases, the total VPN node configuration data 322 is only for a portion of and/or some of the VPN nodes of VPN 104. All VPN nodes should eventually have and maintain a complete set of data for the VPN data 352. As that data changes over time, their own individual representations will be correspondingly updated using the registries. However, at the beginning, no node knows about the existence of any other node. This is one of the functions of the registries: to not only discover the key data for each node but also of the existence of the nodes themselves.

The VPN configuration data generator 350 is configured to generate VPN configuration data 352 for the VPN nodes of VPN 104 from the total VPN node configuration data 322. The VPN configuration data 352 may be generated for the VPN nodes of all of the VPN nodes of VPN 104. In other cases, the VPN configuration data 352 may be determined for at least one VPN private nodes and at least one VPN public nodes by using the private determined IP addresses and port addresses of VPN nodes of the VPN.

The VPN builder 360 is configured to build the VPN 104 of the hybrid or multi-cloud cluster from the for the VPN nodes using the VPN configuration data 352. For example, builder 360 builds configuration 362 of VPN 104 based on the generated VPN configuration data 352.

Configuration 362 may include an up to date list of all of the VPN nodes of VPN 104 based on VPN configuration data 352. An up to date list of all of the VPN nodes of VPN 104 may be a real time list that is updated by periodically receiving VPN Configuration Data 352, updated based on expected peer nodes of the VPN nodes that are not up and/or reconnecting with expected peer nodes of the VPN nodes so that they are now up.

The configuration 362 can be accessed or used, as shown by the arrow to: 1) properly address for transmission to another VPN node, data packets obtained from applications and/or containers of the node; and 2) properly submit to applications and/or containers of the node, data packets received from other VPN nodes. In some cases, each VPN node maintains a configuration 362 of the VPN data, data 352 or data 361, but it gets that data from the registries, and not directly from another node's configuration 362. A purpose of the registries is to facilitate this flow of configuration data through aggregation and availability. Each registry, to a greater or lesser extent, depending up its abilities, aggregates the known possible VPN endpoints of each node such that the other nodes can query the registries, internally aggregate those possible endpoints from the set of registries, and then iterate through that set of endpoints to attempt connection to each other node until a VPN connection is established to each other node. This may be part of the process performed by controller 320 to build configuration 362.

Building the VPN 104 may include each of the VPN nodes of the VPN 104: 1) connecting with most of the other VPN nodes based on the VPN configuration data 352 or configuration 362; and 2) sharing the registry data, or VPN configuration data 352 with the connected to other VPN nodes.

Operating system 264 can be configured to automatically determine the total VPN node configuration data 322, generate the VPN configuration data 352, and build configuration 362 of the VPN 104 upon user activation of an enablement flag of the operating system. Here, building includes deterministically generating the VPN 104 from a default configuration. Deterministically generating may use an algorithm that, given a particular input, will always produce the same output, with the underlying machine always passing through the same sequence of states. Deterministic algorithms are by far the most studied and familiar kind of algorithm, as well as one of the most practical, since they can be run on real machines efficiently.

In some cases, upon user activation of an enablement flag, the operating system automatically begins and periodically repeats the determining data 322, generating of the VPN configuration data 352, and building of configuration 362. While a user may override various values of the VPN 104, the system 102 will just work by default without any user-based configuration or coordination. Consequently, system 102 is a tight integration between the operating system 264, the discovery agents, Kubernetes and the WireGuard interface, that allows a simple way for the user to setup an encrypted network that can span firewalls and different networks and cloud providers.

An exciting side-effect of the secure overlay of VPN 104 is that OS 264 can trivially build its own pod-to-pod route-based communication pathways for the containers as a fallback or even replacement of other processes for building those paths. This trivially build can be done by the OS even for IPv6 and without router coordination or BGP. This trivially build does not take the place of a load balancer, for external access, but for intra-cluster communication, it is a great help. Usually, pod-to-pod networking (specifically the reachability of pods on one node to pods on another node) is the domain of the CNI (Kubernetes Container Networking Interface) drivers. CNIs generally run inside Kubernetes and thus require Kubernetes to be working for they themselves to work . . . but also vice-versa: Kubernetes requires the CNI to be working in order for it to work. This presents something of a difficulty . . . a chicken-and-egg problem. CNIs each have their own ways of dealing with this problem, but it usually comes down to the Kubernetes API being mandatorily reachable without any Kubernetes networking, by the CNI. KubeSpan (especially with the external registry/discovery service 120) allows both node-to-node and pod-to-pod networking to commence before and without the CNI being up. This allows administrators to debug CNI problems even across disparate physical locations and networks. The trivial build in this instance means that KubeSpan has all the data and transports necessary to connect pod-to-pod networking, with no need of the CNI. It can (and does) internally facilitate that communication, and while when the CNI is functioning, it may also supply such functionality, in all cases, that traffic is transported and secured by Wireguard in this system.

VPN nodes of VPN 104 may include network route nodes configured to communicate data packets between nodes of the VPN nodes that are not directly connected to each other. Route node selector 380 is for selecting route nodes such as node discovery agent (also a route node) 130. Selector 380 may communicate with node discovery agent 130, as shown by the arrow. Route node selector 380 may dynamically select node discovery agent 130 as one of the VPN nodes designated as a network route node for a given Layer 3 subnet of a number of Layer 3 subnets of VPN 104. That is, node discovery agent 130 has connectivity between all known Layer 3 subnets of the given Layer 3 subnet of VPN 104 that it will be a route node for. In some cases, node discovery agent 130 is a network router. In some cases, selecting node discovery agent 130 includes declaring a route node: statically for a Layer 3 subnet, in the machine configuration of the network route node, or by the operating system 264 dynamically determining the node discovery agent 130 is a network route node from the available node of VPN 104 and their connectivity.

The network route nodes may include layers of route nodes that include nodes that vie for higher-order routes for all Layer 3 subnets because they need to offer connectivity regardless (not shown), and direct nodes that offer closer sets of routes such as node discovery agent 130. A VPN node may be a member of any number of subnets and it may be authoritative for any number of subnets. Subnet is an abbreviation for sub-network. That is, it is a subdivision of a network into a separate logical unit. Imagine a classification of all VPN node s in the world: VPN node s. You don't know much of anything about all the other VPN nodes, but you do know about the subset of VPN node s under system 102's domain. Thus, system 102 has a subnet of VPN nodes 104 over which it is authoritative. In our case, the VPN nodes 104 in cluster 100 are those over which system 102 has authority. Perhaps system 102 has those VPN nodes 104 further grouped by which cloud and/or NAT they are in. Each of those further groups may be called a subnet of VPN nodes 104. Moving outward, system 102 may also be a member of the subnet of VPN nodes which is the set of VPN nodes outside of cluster 100, such as of a town or city. System 102 would then be a member of that subnet of VPN nodes. Still, system 102 does not know anything about the VPN nodes outside its cluster 100. The system does know, though, that to reach all those other VPN nodes, it will need to communicate out of cluster 100. Those communication paths are the gateways to the other subnets of VPN nodes, of the gateway(s) to the VPN nodes. Subnets inside a cluster may not be able to reach VPN nodes outside the cluster; in the rest of a city, though. The subnets may be subnetted into their VPN nodes apple subdivision or cluster 100, and they cannot directly reach the gateways of the other cluster's VPN nodes (out of town). Instead, these subnets have to travel their own local roads, and pass through a route node first.

In some cases, where VPN interface 370 is a standardized protocol, such as for WireGuard, node discovery agent 130 does not have to be a VPN node or have operating system 264. However, OS 264 can provide the functionality of node discovery agent 130 if needed.

The network route nodes may give different IP address prefixes to different VPN nodes (or subnets). The given prefixes are based on a reserved IPv6 address space range for the VPN nodes that is used to deterministically select for each VPN node, a prefix and an address range of the reserved IPv6 address space range to create the globally-unique local address for each IP address of each VPN node.

For example, if interface 370 does not allow the same network prefix to be served by two nodes, robustness can be achieved by the route nodes offering IP prefixes having reasonable default values to the subnets. Here, node discovery agent 130 may offer node 110_f_ IP addresses 10.1.2.0/23 having prefix/23 for all subnets of node 110_f_. Using the above neighborhood vs house apples metaphor, this would be Higher order routes are analogous to routing VPN node s outside of cluster 100 or to a larger "neighborhood" instead of single cluster. The higher order subnet is the neighborhood subnet, which is itself comprised of a number of cluster subnets. However, in no case is addressing being provided by this system 102. The addresses for the higher order subnet (other than the Wireguard interface address itself, which is effectively invisible to external components and thus is not important to understand the general function) are assigned in a manner external to the system 102 (DHCP, static configuration, etc.). So, discovery agent 130, as a route node does not "offer" any node and IP address. The route node instead says that it can route addresses for the higher order subnet. That is, it announces to the rest of the nodes of VPN 104 that it will handle communications to all VPN node s in cluster 100, e.g., within its neighborhood. This is necessary because and when: a) various VPN node s within that cluster 100 are unable to communicate directly to the world of VPN node s at large and b) the VPN 104 does not allow two nodes to simultaneously be authoritative for the same set of VPN node s at the same time.

Figure 3B:
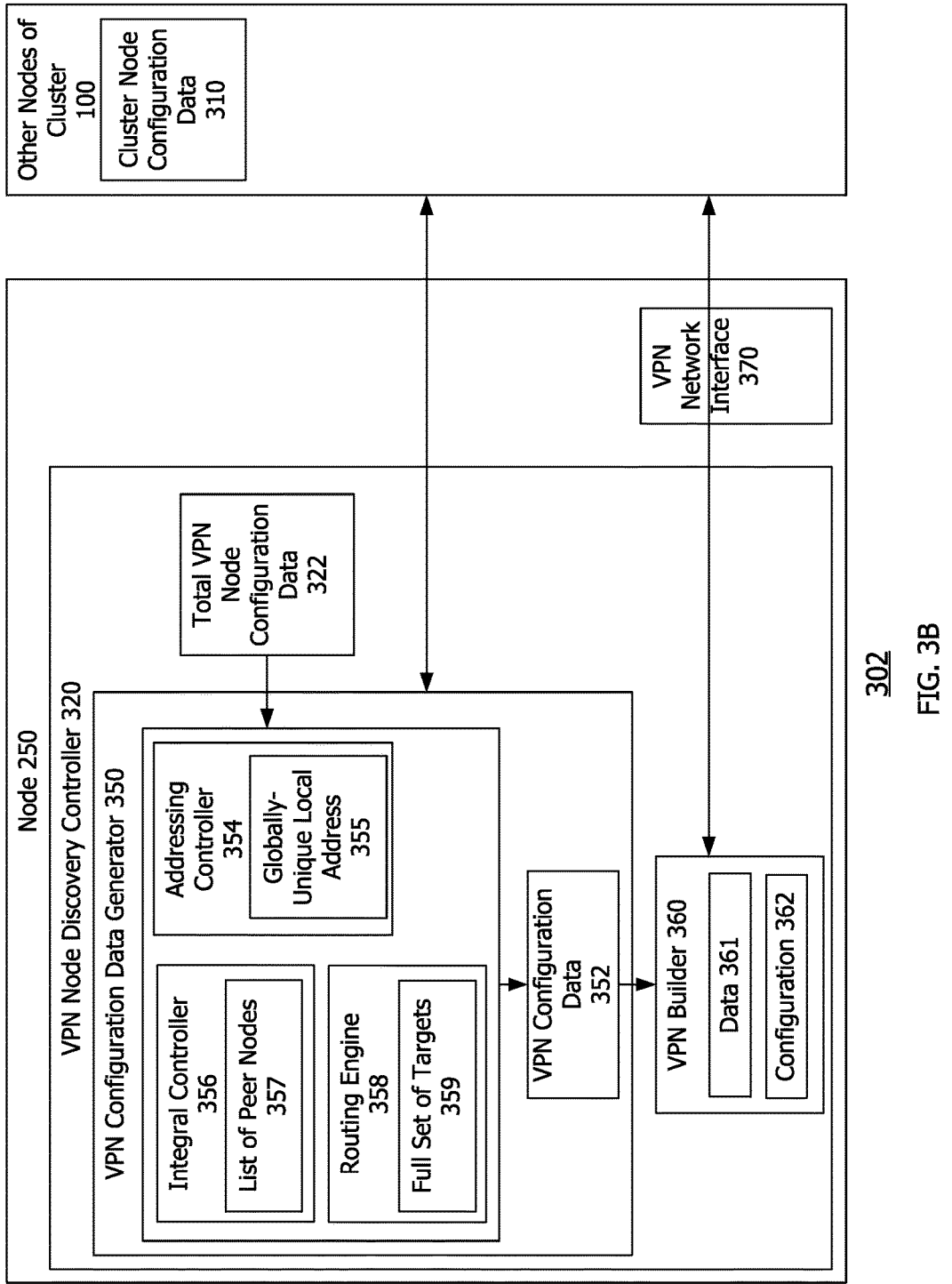
FIG. 3B is an example of additional details of VPN node discovery controller of a VPN node of FIG. 2B.

FIG. 3B is an example 302 of additional details of VPN node discovery controller 320 of a VPN node 250 of FIG. 2B and the controller 320 connections to other cluster components of the system 102 and/or cluster 100. VPN node discovery controller 320 is shown having total VPN node configuration data 322 sent to each of addressing controller 354, integral controller 356, routing engine 358 and VPN configuration data 352 of VPN configuration data generator 350. Data 352 is sent to VPN builder 360 to build VPN 104 such as using configuration 362 of VPN 104. When OS 264 is using WireGuard® as a VPN network interface 370, controller 356 may be called a "WgLAN" controller. The connections to between generator 350 and cluster 100 is not made through interface 370.

The addressing controller 354 is configured to automatically and autonomously create a globally-unique local address 355 for its VPN node, Node 250, as per Internet Engineering Task Force (IETF) Request for Comments (RFC) 4193, where the Global and Subnet IDs are derived from a shared, unique, and randomly-generated identifier for cluster 100. In all cases, addresses 355 are unique for each VPN node. Having addressing controller 354 automatically create address 355 greatly reduces the number and complexity of user-side configuration and interactions.

Creating address 355 may include controller 354 specifying an IP prefix to use for the VPN network 104 that has a reasonable default value. An IP address is represented as aaaa:bbbb:cccc:dddd:eeee:ffff:gggg:hhhh/n, where "/n" is the prefix length. The prefix length is the number of most significant bits of the IP address which comprise the identity of the subnet to which it belongs. For example, 2001:0db8: 1001:2002:3003:4004:5005:6006:/64 means, the first 64 bits are used to represent the network and the remaining 64 bits are used to identify hosts and may be either sub-aggregated or assigned to devices within the network that owns the prefix. ULA addresses are by definition IPv6 addresses, so IPv6 addresses are used in this example. However, a similar concept applies to IPv4. In either case, the number following the/is the prefix length, not merely the prefix.

Creating address 355 may include controller 354 using RFC 4193 to reserve an IPv6 address space for the use of globally-unique local addresses. A routing prefix in the range fd00::/8 may be constructed by generating a random 40-bit hexadecimal string, taken for this example to be 0x123456789a. This may describe the mechanism for choosing the network identity. In the case of system 102, this value is predetermined and fixed for a given cluster 100.

The integral controller 356 is configured to constantly keep a list of expected peer nodes 357 of the VPN nodes up-to-date by merging all data from each of the discovery agents that portions of VPN node configuration data 321 are being received from, keyed by the public key of each expected peer. Each peer may be a VPN node of VPN 104 that the node 250 has listed for that VPN node to connect to of data 322. The term "peer" is what Wireguard OS uses to describe another node to which it is connected. In some cases, every VPN n ode of VPN 104 is created as a peer after it is discovered from a registry. The list 357 may be a list of endpoints (e.g., IP addresses and port addresses for that node to connect to). Endpoints are managed by controller 356. The list of endpoints is the one from which addresses are selected to try for Wireguard Peers to connect, such as using interface 370. Keeping list 357 may include creating the list of of VPN endpoint nodes (e.g., IP addresses) for that VPN node to connect to of the VPN nodes of VPN 104 from the three key data; then adding the combined total VPN node configuration data 322 from controller 340 to the created list; then adding the globally-unique addresses 355 of controller 354 to the added to list; and then keying or indexing the list by the public key of each expected peer or accepted IP address on the list. The keyed and added to list with globally-unique address 355 may be the list of expected peer nodes 357.

Keeping list 357 may also include, for each of expected peer node of the VPN nodes that communication is not received from for a threshold time period (e.g., which is not "up"), cycling through available potential IP addresses for the peer that has been amalgamated from the discovery agents, until such time as the integral controller 356 forms a connection with the expected peer node of the VPN nodes that communication is not received from. The threshold time period may be a peer down interval which is the time since last handshake when the established peer is considered to be down. It can start at 275 seconds. It can then shorten with each cycle by between 5 and 30 seconds. For example, it is assumed an endpoint is ultimately down if controller 356 has not seen handshake for more than the peer down interval, but as the endpoints get updated controller 356 wants faster feedback, so it starts checking more aggressively that the handshake happened within a shortened period since the last endpoint change. In other cases, the threshold time period can be 5, 10 or 20 minutes.

The connection may be formed from controller 320 to cluster 100. Once the connection is formed, it is maintained until lost by the peer node not being up, at which point integral controller 356 will begin cycling again. For example, say a given node N1 has an IP address of 192.168.1.101. When it talks to nodes across the Internet, it is NATed by its network service provider to an address of 10.1.2.101. While N1 only knows the first address, N2 which is on a different network, sees it as 10.1.2.101. It notifies the registry of this additional address (actually, it would be a fully-qualified endpoint with whatever port number it sees, as well). Node N3 is also on a different network from N1. It tries first connecting to 192.168.1.10, but that fails. So, it rolls over to use 10.1.2.101, which succeeds. Keep in mind that all of these cases actually ue IP+port, not merely IP. So N1 actually sees itself as, say 192.168.1.101:51280, and N2 sees N1 as 10.1.202.101: 53120, and N3 connects to N1 at 10.1.202.101:53120.

The routing engine 358 is configured to maintain a full set of cluster targets 359 in a table. Routing engine 358 also marks packets destined to any of these targets 359 to be routed through the Wireguard interface, such as with a unique ID, which can be used by netfilter to handle those in a special way. The routing engine 358 is primarily responsible for the protocol intelligence of the VPN node 250. Node 250 creates a routing table of the cluster targets 359, which consists of all routes learned by all protocols running on the node 250. The kernel's routing table may not contain a full set of cluster targets. Instead, an NFTables set contains a full set of targets 359. NFTables is instructed by engine 358 to mark any packet destined for any of those targets 359 with a fwmark (firewall mark) or a unique ID, which can be used by netfilter to handle those in a special way. The kernel's routing rules system or engine 358 is configured to look for packets with that mark and send them to a special routing table. That special routing table then sends all packets to the Wireguard interface. All normal routing, interfaces, chassis components, system management, etc. may be handled variously by the kernel and other userspace tools.

The full set of cluster targets 359 is maintained by engine 358 under a table along with rules to mark packets which are destined to cluster targets 359. The table may be the routing table to which the full set of cluster targets 359 which may be or include the accepted IP address for that VPN node are sent. The marking may be NFTables-based marking that works in tandem with IP Rules in the routing engine to pass all such traffic through VPN interfaces 370 of the VPN nodes or cluster components of VPN 104.

NFTables is a table-based system by which the userspace may manipulate the kernel's netfilter subsystem, which provides a facility to affect firewalling, NAT, and other features. NFTables is used here as software that provides an in-kernel packet classification framework that is based on a network-specific VM. NFTables uses the Netfilter subsystems by attaching to the netfilter system's hooks, providing access to the connection tracking system, including features such as NAT, queuing, tracing, limiting, and logging.

Maintaining targets 359 includes (routing engine 358) packet marking data packets sent between the VPN nodes of VPN 104 with a packet fwmark (firewall mark), a unique ID, which can be used by netfilter to handle those in a special way, and/or NFTables-based marking that works in tandem with IP Rules in the routing engine to pass all such traffic through VPN interfaces 370 of the VPN nodes. Maintaining targets 359 also includes discovering data packets sent between the VPN nodes that are not marked as being sent from a packet interface source of one of a VPN node of VPN 104. Maintaining targets 359 then includes "send" marking packets which are not marked as being sent from a packet interface source of one of a VPN node to be sent to a packet interface source of a VPN interface 370 of a VPN node or cluster component of VPN 104.

The "send" marking may be described as a marking to inverse the Wireguard packet marking selection. Basically, packets emanating from Wireguard are marked by Wireguard with a unique ID, which can be used by netfilter to handle those in a special way. Here, engine 358 send marks packets which are a) not marked with the ID Wireguard uses and b) have a destination IP which matches one of our set of targets 359. The se packets are send marked by the rules engine 358 add and maintain in NFTables to be routed by Netfilter to engine 358's special routing table which then sends those packets to the Wireguard interface or interface 370. Wireguard interface takes those, encrypts those, and then sends them on through the normal host routes to their respective Peer node.

The full set of cluster targets 359 may include the keyed and added to list of expected peer nodes 357 having globally-unique addresses 355. Also, the VPN configuration data 352 may include or be the full set of cluster targets 359, the list of peer nodes 357 and/or the globally-unique addresses 355.

The VPN builder 360 is configured to build the configuration 362 of VPN 104 using the VPN configuration data 352 of all of the VPN nodes of VPN 104. Data 352 is a real time list that is updated as described for full set of cluster targets 359, list of expected peer nodes 357 and globally-unique addresses 355.

In some cases, the (internal/external) discovery agent lives inside the node's WgLAN/KubeSpan program. The agents talk to registries, which are outside the node's WgLAN/KubeSpan program. Internal registries may exist inside one or more node(s) and thus be labeled as a registry that is "internal" as opposed to "external". To WgLAN/KubeSpan, internal and external registries are functionally the same. The importance of the distinction comes down to administrative trust, for which operators of cluster may have concern.

VPN data 352 contains the aggregated set of VPN connection information which includes everything necessary to configure the VPN 104, including public keys, endpoint possibilities, authoritative IP addresses and subnets, and unique identifiers for nodes within the cluster. Builder 360 takes these data 352 and converts them into structures directly usable by Wireguard to establish the VPN 104. In some cases, data 352 is fed into builder 360 which outputs Wireguard configuration data 361 and then configures the kernel's Wireguard controller interface with that data 361. Once configured, the kernel's Wireguard controller maintains the configuration 362 of VPN 104 until reconfigured by builder 360 upon updates to cluster metadata. In this sense, the configuration 362 of VPN 104 may be a configured VPN 104 for a copy of the VPN 104.

Description of Processes

Figure 4:
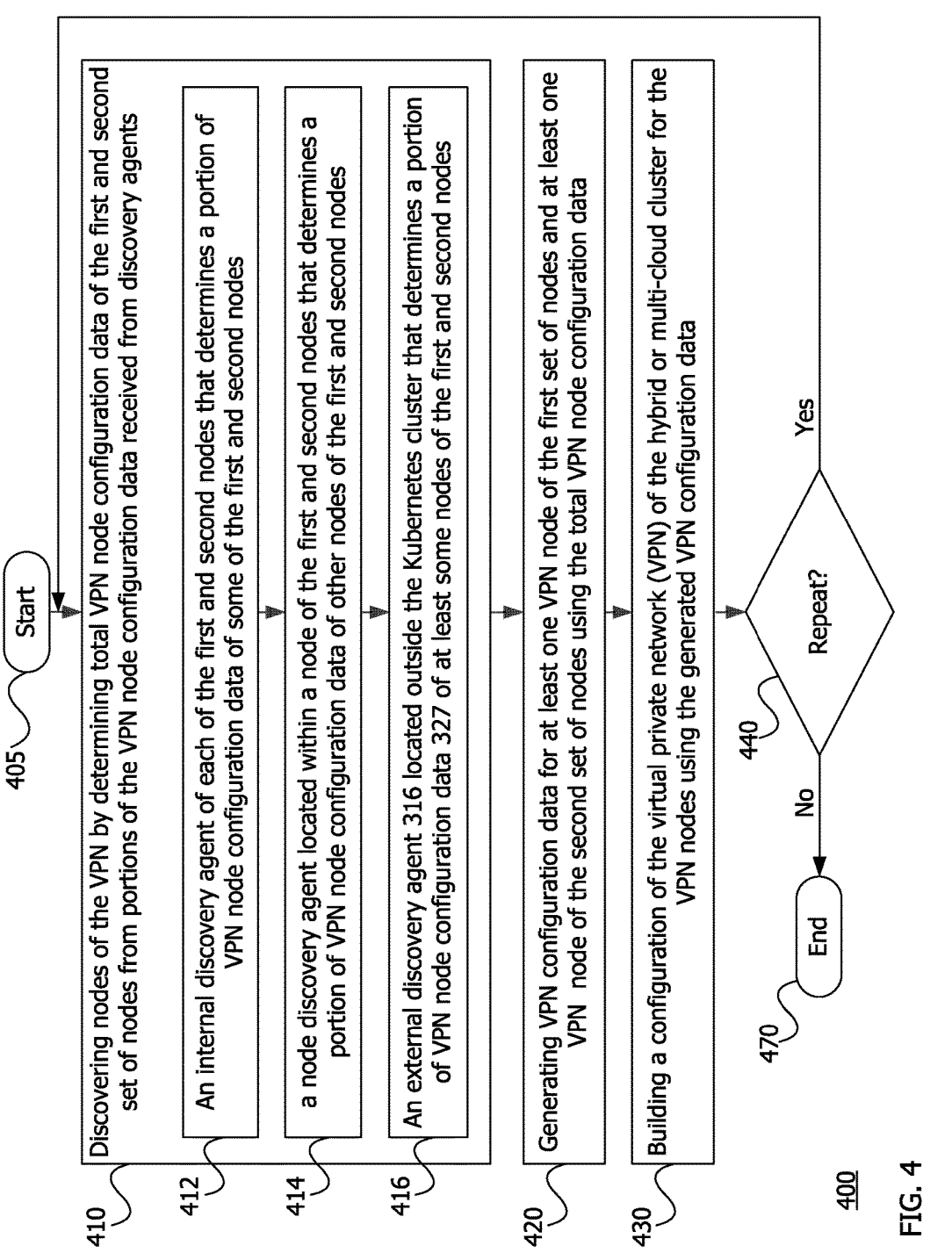
FIG. 4 is an operating environment/process for building the VPNs between clouds of the cluster of FIG. 1.

Referring now to FIG. 4, there is shown an operating environment/process 400 for building a mesh VPN in a Kubernetes cloud cluster including a private cloud having a first set of network nodes connected to a second set of nodes of a public cloud. The process 400 may describe system 102 building VPN 104 of a computer cluster 100. Process 400 may be performed by system 102; each of the first and second nodes set of nodes; and/or one VPN node 250. The process 400 starts at 405 and can end at 470, but the process can also be repeated as shown by the "yes" loop from 440 to 410, which provides building of VPN information in a "continual automated" manner. Process 400 can be repeated periodically, such as every 1, 5, 10, 30 or 120 minutes.

At 410 nodes of the VPN 104 are discovered by determining a total VPN node configuration data 322 of the first and second set of nodes of the Kubernetes cluster 100 from portions of the VPN node configuration data 321 received from discovery agents. Discovering at 410 includes discovering VPN nodes of VPN 104 such as noted for FIGS. 3A-B. More specifically, discovering at 410 includes discovery agents 312, 130 and 316 determining portions of VPN node configuration data 321 that will be combined to create the total VPN node configuration data 322.

For example, at 412 an internal discovery agent 312 of each of the first and second nodes that is a Kubernetes API, determines a portion of VPN node configuration data 322 of some of the first and second nodes.

Also, at 414 a node discovery agent 130 located within a node of the first and second nodes determines a portion of VPN node configuration data 322 of other nodes of the first and second nodes.

At 416 an external discovery agent 316 located outside the Kubernetes cluster determines a portion of VPN node configuration data 322 of at least some nodes of the first and second nodes.

Discovering at 412, 414 and 416 includes descriptions of agents 312, 130 and 316 determining portions of VPN node configuration data 321 from FIGS. 3A-B. Discovering at 410 includes each discovery agent determining the portion of VPN node configuration data 321 from cluster node configuration data 310, and combining the determined portions of VPN node configuration data 312 received from discovery agents 312, 130 and 316 into a total VPN node configuration data 322. Discovering at 410 may include identifying single and double NATed private IP addresses and private port addresses. Discovering at 410 may include determining multiple endpoint IP addresses and port addresses; shared cryptographic public key; and a list of accepted IP address for that node to connect to, for each of the first and second set of nodes of the Kubernetes cluster and/or only for VPN nodes of VPN 104 from the portions of VPN node data 321 from the discovery agents. Discovering at 410 may include the external discovery agent periodically updating the operating systems by sending them the determined portion of VPN node configuration data 321. Discovering at 410 may include an external discovery agent collating, sending and securing the portion of VPN node configuration data 321. Discovering at 410 may include dynamically choosing a route node and route nodes communicating data packets between nodes of the VPN nodes that are not directly connected.

After discovering at 410, at 420 VPN configuration data 352 for at least one VPN node of the first set of nodes and at least one VPN node of the second set of nodes is generated using the total VPN node configuration data 322. Generating at 420 includes generating VPN configuration data 352 such as noted for FIGS. 3A-B. Generating at 420 may include creating a globally-unique local address for each IP address of each VPN node. Generating at 420 may include constantly keeping a list of expected peer nodes of the VPN nodes up-to-date, cycling through available potential IP addresses for each of expected peer nodes of the VPN nodes that communication is not received from, and maintaining the connection until lost. Generating at 420 may include packet marking and maintaining a full set of cluster targets of the VPN nodes.

After generating at 420, at 430 a configuration of the VPN of the cloud cluster is built for the VPN nodes using the generated VPN configuration data 352. Building at 430 includes building configuration 362 (e.g., a copy of VPN 104 or configured VPN 104) using data 361, such as noted for FIGS. 3A-B. Building at 430 may include deterministically generating the configuration of the VPN from a default configuration. Building at 430 may include each of the nodes connecting with most of the other nodes and sharing registry data as noted for FIGS. 3A-B.

Process 400 may include automatically beginning at start 405 and periodically repeating at 440 determining, generating and building upon user activation such as noted for FIGS. 3A-B.

Figure 5:
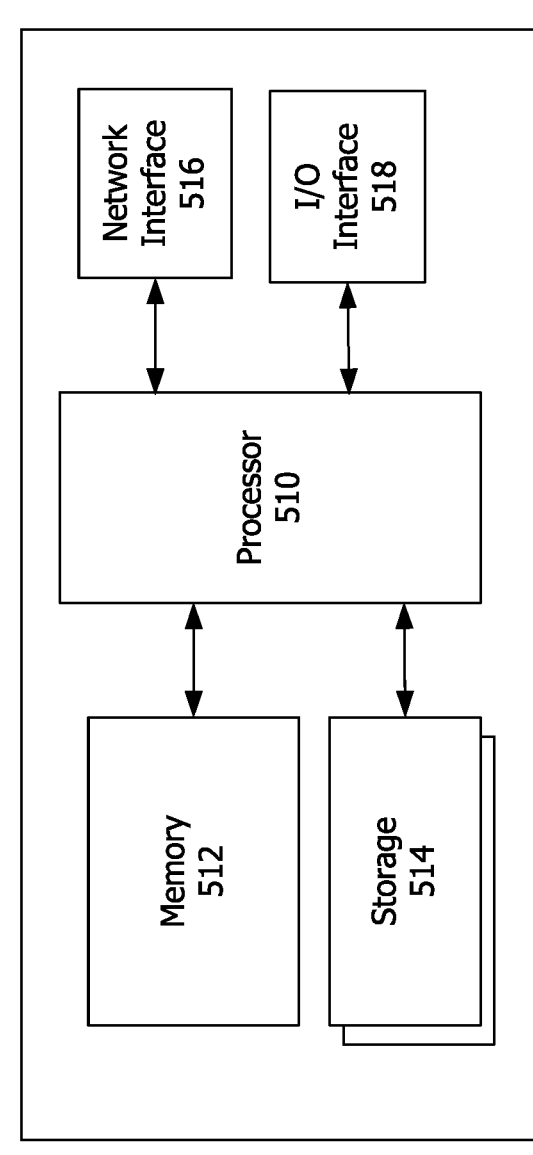
FIG. 5 is a block diagram of a computing device.

FIG. 5 is a block diagram of a computing device 500. The computing device 500 may be representative of the system 102; each of the first and second nodes set of nodes; and/or one VPN node 250. The computing device 500 may be a desktop or laptop computer, a server computer, a client computer, a network router, a network node, a network switch, a tablet, a smartphone or other mobile device. In some cases, it is a node of cluster 100, a component of cluster 100, and/or a VPN node of VPN 104. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, a system of two physical nodes may provide continual automated building of the VPN of clouds 140, 150 and 160, and VPN 104 between those clouds.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510. As used herein the term "memory" corresponds to the memory 512 and explicitly excludes transitory media such as signals or waveforms.

The storage 514 provides non-volatile, bulk or long-term storage of data or instructions in the computing device 500. It may be internal or external storage. The storage 514 may take the form of a magnetic or solid-state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid-state memory devices, the memory 512 and storage 514 may be a single device.

The network interface 516 includes an interface to a network such as a network that can be used to communicate calls, signals, streams, arrays, flagged samples and feedback described herein. The network interface 516 may be wired or wireless.

The I/O interface 518 interfaces the processor 510 to peripherals (not shown) such as displays, video and still cameras, microphones, keyboards and USB devices.

In some cases, storage 514 is a non-volatile machine-readable storage medium that includes all types of computer readable media, including magnetic storage media, optical storage media, and solid-state storage media. It should be understood that the software can be installed in and sold with the system 102, the object 120 and/or the object 130. Alternatively, the software can be obtained and loaded into the system 102, the object 120 and/or the object 130, including obtaining the software via a disc medium or from any manner of network or distribution system, including from a server owned by the software creator or from a server not owned but used by the software creator. The software can be stored on a server for distribution over the Internet.

Although descriptions herein apply to a Kubernetes managed cluster, such as cluster 100, the descriptions herein can be applied to a hybrid or multi-cloud cluster having a different container management system that can manage containerized applications across a cluster of server nodes. In other cases, the descriptions herein can be applied to a hybrid or multi-cloud cluster that does not have a container management system, such as where all of the discovery agents are one or more external discovery agents; or one or more external discovery agents with one or more node discovery agents.

Although descriptions herein apply to system 102 building and VPN 104 being a WireGuard-based VPN, the descriptions herein can be applied to system 102 building and VPN 104 being another interface based VPN network that is not WireGuard-based, such as IPSec by Internet Engineering Task Force (IETF).

The technologies herein, such as system 102; sets of nodes of the private and public clouds; VPN node 250; and/or processes they perform increase computer and network efficiency because they provide an automated, faster, and more secure way of building a mesh VPN 104 in a cloud cluster. These technologies provide a more efficient way of building the VPN 104 and a more accurate VPN than other systems or OSes. These technologies also increase computer and network efficiency by facilitating services external to the cluster 100 itself but that need reachability to all nodes of the cluster for management purposes, such as cluster API-powered systems which manage bare metal infrastructure for Kubernetes and services for deployment and management of Kubernetes from one management plane. These technologies also increase computer and network efficiency by having VPN 104 functioning or "up" when Kubernetes itself is not, thus facilitating maintenance during a Kubernetes outage, as well as providing for a better bootstrapping experience. Another benefit of these technologies is that they do not require a container networking interface (CNI) or any other generic plugin-based networking solution for containers.

For example, when a worker node 110d is started in one network cloud 150 (say, AWS) where it cannot directly reach the control plane node 110b because it is running on premises of cloud 140 behind a NAT 142, the external discovery agent 120 is configured to be contacted by NATed nodes 110d and 110b. When two nodes 110d and 110b which are both behind NAT need to connect, they contact the external discovery agent 120. This opens a port in the firewall of nodes 110d and 110b to the agent 120. The external discovery agent 120 records the ports of the NATed nodes 110d and 110b the external discovery agent is being contacted through. Agent 120 will give that IP and port of NATed nodes 110d and 110b to any other VPN node which asks for it or asks to connect with the NATed nodes. In most cases, this will then allow the two NATed nodes 110d and 110b to communicate directly with one another, reusing that same port. Of note, only one of the two NATed servers needs to be behind a full cone NAT. Once one direction is established, the other will follow, and that will be direct, negating the need for full-cone NAT.

In another example, when a cluster 100 with two control plane nodes 110*d* and 110*e* in AWS cloud 150 needs to be expanded to include a number of high-powered machines of nodes 110*a* and 110*b* located on the customer premises of cloud 140. When both clouds have nodes behind NATs 162 and 142, respectively, the external discovery agent 120 is configured to be contacted by and register these VPN nodes that are NATed nodes. All of these four nodes register with the external discovery agent 120, which is a combination HTTPS and UDP system which records members of the cluster 100, the IP addresses of these four nodes (both direct and apparent outside NAT), and their apparent UDP service ports. Each of these four nodes then contacts the external discovery agent 120 to find the connection and public key details for every other of these four nodes node in the cluster 100. At this point, each of these four nodes node tries to establish a connection to each other of these four nodes, cycling through the available IP and port combinations until it succeeds, such as noted for listing of peer nodes 357 and/or full set of targets 359. In some cases, the remote side will connect first, which will also terminate the cycling. As nodes are added, moved, or removed, the peering mesh is updated and any missing links are reestablished, such as noted for list of peer nodes 357 and/or full set of targets 359.

Within this description, the term "system" may mean a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic device (PLD), or a programmable logic array (PLA). The gate netlist or other physical description may be converted into process instructions and masks for fabricating the engine within an application specific integrated circuit (ASIC).

Within this description, the term "system" may also mean a collection of hardware, firmware, and/or software, which may be on a larger scale than an "engine". For example, a system may contain multiple processors, some of which may perform similar functions in parallel. The term "system" does not imply any physical separation or demarcation. All or portions of one or more systems may be collocated on a common card, such as a network card 516, or within a common FPGA, ASIC, or other circuit device.

Although shown implemented in a computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The system 102; each of the first and second nodes set of nodes; and/or one VPN node 250 may include hardware, software, firmware, or a combination thereof. Additionally, fewer cluster nodes, VPN nodes, modules or other arrangements of software, hardware and data structures may be used to achieve the processes and apparatuses described herein.
Closing Comments Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:
1. A system for building a mesh virtual private network (VPN) in a cloud cluster, the system comprising:
    the cloud cluster including first network nodes in a private cloud connected with second network nodes of a public cloud;
    at least one of the first network nodes and the second network nodes having a respective operating system including a VPN node discovery controller having:
        a VPN node configuration data controller configured to discover nodes of the VPN by determining IP addresses and port addresses of the first network nodes and the second network nodes from discovery agents including:

an internal discovery agent of at least one of the first network nodes and the second network nodes that includes a Kubernetes API and that uses an annotation-marked Kubernetes node resource to determine IP addresses and port addresses of some of the first network nodes and the second network nodes;

a node discovery agent located within a node of the first network nodes and the second network nodes that includes a Kubernetes API and that determine IP addresses and port addresses of other nodes of the first network nodes and the second network nodes; and an external discovery agent located outside the cloud cluster that includes a Kubernetes API and that determines IP addresses and port addresses of a least of the first network nodes and the second network nodes; and at least one of:

a VPN configuration data generator configured to generate VPN configuration data for at least one VPN node of the first network nodes and at least one VPN node of the second network nodes using the determined IP addresses and port addresses; or a VPN builder configured to build a configuration of the VPN of the hybrid or multi-cloud cluster for the VPN nodes using the VPN configuration data.

2. The system of claim 1, wherein VPN node configuration data controller includes a private address identifier to discover nodes of the VPN by:

identifying private single network address translated IP addresses and private port addresses of the first network nodes and the second network nodes from public ones of the determined IP addresses and port addresses of the VPN nodes by automatically penetrating network address translation (NAT);

identifying double network address translated IP addresses and private port addresses of the first network nodes and the second network nodes from public ones of the determined IP addresses and port addresses of the VPN nodes by one of automatically penetrating NAT or using additional tooling external to the operating system.

3. The system of claim 1, wherein discovering nodes of the VPN includes determining multiple endpoint IP addresses and port addresses; shared cryptographic public key; and a list of accepted IP address for that node to connect to, for each of the first network nodes and the second network nodes from the discovery agents.

4. The system of claim 1, wherein discovering nodes of the VPN includes:

each discovery agent determining the IP addresses and port addresses of some of the first network nodes and the second network nodes of from cluster node configuration data of the clusters that is received by the discovery agents, and sending the determined IP addresses and port addresses of some of the first network nodes and the second network nodes to the VPN node configuration data controller; and the VPN node configuration data controller combining the determined IP addresses and port addresses of some of the first network nodes and the second network nodes.

5. The system of claim 1, wherein the cluster includes nodes that periodically provide the external discovery agent with VPN node IP addresses and port addresses, and wherein discovering nodes further comprises the external discovery agent periodically updating the operating systems of the first network nodes and the second network nodes with the determined IP addresses and port addresses.

6. The system of claim 1, wherein the external discovery agent:

is a server that is not one of the first network nodes or the second network nodes;

collates the IP addresses and port addresses;

sends the collated IP addresses and port addresses to the first network nodes and the second network nodes.

7. The system of claim 1, wherein the VPN allows data and applications to be shared between the public cloud and the private cloud;

each operating system is configured to automatically begin and periodically repeat determining, generating and building upon user activation of an enablement flag of the operating system;

building includes deterministically generating the configuration of the VPN from a default configuration; and building the configuration of the VPN includes: each of the nodes of the first network nodes and the second network nodes 1) connecting with most of the other nodes of the first nodes and the second nodes based on the VPN configuration data; and 2) sharing registry data with the connected to other nodes of the first network nodes and the second network nodes.

8. The system of claim 1, each operating system further comprising an addressing controller configured to create a globally-unique local address for each IP address of each VPN node by:

using a reserved address space range for the VPN nodes; and deterministically selecting for each VPN node, a prefix and an address range of the reserved address space range to create the globally-unique local address for each IP address of each VPN node.

9. The system of claim 1, each operating system further comprising an integral controller configured to:

keep a list of expected peer nodes of the VPN nodes up-to-date by merging all data from each of discovery agent that IP addresses and port addresses are being received from, keyed by the public key of each expected peer;

for each of expected peer nodes of the VPN nodes that communication is not received from for at least a predetermined period of time minutes, cycle through available potential IP addresses for the peer from the discovery agents, until such time as the integral controller forms a connection with the expected peer node of the VPN nodes that communication is not received from; and maintain the connection until lost.

10. The system of claim 1, each operating system further comprising a routing engine configured to:

mark data packets sent between the VPN nodes with a packet interface source;

discover data packets sent between the VPN nodes that are not marked as being sent from a packet interface source of one of the operating systems;

mark packets which are not marked as being sent from a packet interface source of one of the operating systems to be sent to a packet interface source of one of the operating systems, wherein marking the packets which are not marked works in tandem with passing all packets which are not marked through a packet interface source of one of the operating systems; and maintain a full set of cluster targets of the VPN nodes for that operating system under a table along with rules to mark the packets to be sent to a packet interface source of one of the operating systems.

11. The system of claim 1, wherein the node discover agent is a network route node configured to communicate data packets between nodes of the VPN nodes that are not directly connected:

wherein the node discover agent is dynamically chosen as one of the first and second network nodes for a given Layer 3 subnet of a plurality of Layer 3 subnets of the first and second network nodes, wherein the node discover agent has connectivity between all known Layer 3 subnets of the given Layer 3 subnet of the first and second network nodes.

12. A method for building a mesh virtual private network (VPN) in a cloud cluster including first network nodes in a private cloud connected with second network nodes of a public cloud, the method comprising:

at least one of the first network nodes and the second network nodes:

discovering nodes of the VPN by determining total VPN node configuration data of the first network nodes and the second network nodes from portions of the VPN node configuration data received from discovery agents including:

an internal discovery agent of at least one of the first network nodes and the second network nodes that includes a Kubernetes API and that is for determining a portion of VPN node configuration data of some of the first network nodes and the second network nodes;

a node discovery agent located within a node of the first network nodes and the second network nodes that includes a Kubernetes API, and that is for determining a portion of VPN node configuration data of other nodes of the first network nodes and the second network nodes; and an external discovery agent located outside the cloud cluster that includes a Kubernetes API, and that is for determining a portion of VPN node configuration data of at least some nodes of the first network nodes and the second network nodes; and at least one of:

generating VPN configuration data for at least one VPN node of the first network nodes and at least one VPN node of the second network nodes using the total VPN node configuration data; or building a configuration of the VPN of the hybrid or multi-cloud cluster for the VPN nodes using the generated VPN configuration data.

13. The method of claim 12, wherein determining total VPN node configuration data includes:

1) Identifying private single network address translated IP addresses and private port addresses of the first network nodes and the second network nodes from public ones of the determined total VPN node configuration data of the first VPN nodes and the second set of the VPN nodes by automatically penetrating network address translation (NAT);

2) Identifying double network address translated IP addresses and private port addresses of the first network nodes and the second network nodes from public ones of the determined total VPN node configuration data of the first VPN nodes and the second VPN nodes by one of automatically penetrating NAT or using additional tooling external to the operating system.

14. The method of claim 12, wherein determining total VPN node configuration data includes: determining multiple endpoint IP addresses and port addresses; shared cryptographic public key; and a list of accepted IP address for that node to connect to, for each of the first network nodes and the second network nodes of from the portions of VPN node configuration data from the discovery agents.

15. The method of claim 12, wherein discovering nodes of the VPN includes:

each discovery agent determining the portion of VPN node configuration data of some of the first network nodes and the second network nodes from cluster node configuration data of the clusters that is received by the discovery agents, and sending the determined portion of VPN node configuration data of some of the first network nodes and the second network nodes to the VPN node configuration data controller; and the VPN node configuration data controller combining the determined portions of VPN node configuration data of some of the first network nodes and the second network nodes into the total VPN node configuration data.

16. The method of claim 12, wherein discovering nodes of the VPN includes: the external discovery agent periodically updating the operating systems of the first network nodes and the second network nodes with the determined portion of VPN node configuration data.

17. The method of claim 12, wherein the external discovery agent determining a portion of VPN node configuration data includes:

collating the portion of VPN node configuration data;

sending the collated portion of VPN node configuration data to the first network nodes and the second network nodes.

18. The method of claim 12, wherein each operating system is configured to automatically begin and periodically repeat determining, generating and building upon user activation of an enablement flag of the operating system;

wherein building includes deterministically generating the configuration of the VPN from a default configuration; and wherein building the configuration of the VPN includes each of the first network nodes and the second network nodes 1) connecting with most of the other nodes of the first network nodes and the second network nodes based on the configuration of the VPN; and 2) sharing registry data with the connected to other nodes of the first network nodes and the second network nodes.

19. The method of claim 12, each of the first network nodes and the second network nodes further creating a globally-unique local address for each IP address of each VPN node by:

using a reserved IPV6 address space range for the VPN nodes; and deterministically selecting for each VPN node, a prefix and an address range of the reserved IPv6 address space range to create the globally-unique local address for each IP address of each VPN node.

20. The method of claim 12, for each of the first network nodes and the second network nodes, further including:

keeping a list of expected peer nodes of the VPN nodes up-to-date by merging all data from each of discovery agent that the portion of VPN node configuration data are being received from, keyed by the public key of each expected peer;

for each of expected peer nodes of the VPN nodes that communication is not received from for a predetermined period of times, cycling through available potential IP addresses for the peer from the discovery agents, until such time as the integral controller forms a connection with the expected peer node of the VPN nodes that communication is not received from; and maintaining the connection until lost.

21. The method of claim 12, for each of the first network nodes and the second network nodes, further including:

marking data packets sent between the VPN nodes with a packet interface source;

discovering data packets sent between the VPN nodes that are not marked as being sent from a packet interface source of one of the operating systems;

marking packets which are not marked as being sent from a packet interface source of one of the operating systems to be sent to a packet interface source of one of the operating systems, wherein marking the packets which are not marked works in tandem with passing all packets which are not marked through a packet interface source of one of the operating systems; and maintaining a full set of cluster targets of the VPN nodes for that operating system under a table along with rules to mark the packets to be sent to a packet interface source of one of the operating systems.

22. The method of claim 12, further comprising:

one of the first network nodes and the second network nodes further dynamically choosing the node discover agent as one of the first network nodes and the second network nodes for a given Layer 3 subnet of a plurality of Layer 3 subnets of the first network nodes and the second network nodes, wherein the node discover agent has connectivity between all known Layer 3 subnets of the given Layer 3 subnet of the first network nodes and the second network nodes; and the node discover agent communicating data packets between nodes of the VPN nodes that are not directly connected.

23. A non-volatile machine readable medium storing a program having instructions which when executed by a processor will cause the processor to build a mesh virtual private network (VPN) in a cloud cluster including a private cloud having a first network nodes connected to a second network nodes of a public cloud, the instructions of the program for:

discovering nodes of the VPN by determining total VPN node configuration data of the first network nodes and the second network nodes from portions of the VPN node configuration data received from discovery agents including:

an internal discovery agent of at least one of the first network nodes and the second network nodes that includes a Kubernetes API, and that is for determining a portion of VPN node configuration data of some of the first network nodes and the second network nodes;

a node discovery agent located within a node of the first network nodes and the second network nodes which includes a Kubernetes API, and that is for determining a portion of VPN node configuration data of other nodes of the first network nodes and the second network nodes; and an external discovery agent located outside the Kubernetes cluster that includes a Kubernetes API, and that is for determining a portion of VPN node configuration data of at least some nodes of the first network nodes and the second network nodes; and at least one of:

generating VPN configuration data for at least one VPN node of the first network nodes and at least one VPN node of the second network nodes using the total VPN node configuration data; or building a configuration of the VPN of the hybrid or multi-cloud cluster for the VPN nodes using the generated VPN configuration data.

24. The medium of claim 23, wherein determining total VPN node configuration data includes:

identifying private single network address translated IP addresses and private port addresses of the first network nodes and the second network nodes from public ones of the determined total VPN node configuration data of the first VPN nodes and the second VPN nodes by automatically penetrating network address translation (NAT);

identifying double network address translated IP addresses and private port addresses of the first network nodes and second network nodes from public ones of the determined total VPN node configuration data of the first VPN nodes and the second VPN nodes by one of automatically penetrating NAT or using additional tooling external to the operating system.

25. The medium of claim 23, wherein determining total VPN node configuration data includes determining multiple endpoint IP addresses and port addresses; shared cryptographic public key; and a list of accepted IP address for that node to connect to, for each of the first network nodes and the second network nodes from the portions of VPN node configuration data from the discovery agents.

26. The medium of claim 23, wherein discovering nodes of the VPN includes:

each discovery agent determining the portion of VPN node configuration data of some of the first network nodes and the second network nodes from cluster node configuration data of the clusters that is received by the discovery agents, and sending the determined portion of VPN node configuration data of some of the first network nodes and the second network nodes to the VPN node configuration data controller; and the VPN node configuration data controller combining the determined portions of VPN node configuration data of some of the first network nodes and the second network nodes into the total VPN node configuration data.

* * * * *